US011062358B1

(12) United States Patent
Lewis et al.

(10) Patent No.: US 11,062,358 B1
(45) Date of Patent: Jul. 13, 2021

(54) PROVIDING AN ADVERTISEMENT ASSOCIATED WITH A MEDIA ITEM APPEARING IN A FEED BASED ON USER ENGAGEMENT WITH THE MEDIA ITEM

(71) Applicant: Google LLC, Mountain View, CA (US)

(72) Inventors: Justin Lewis, Marina del Rey, CA (US); Ruxandra Georgiana Davies, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 901 days.

(21) Appl. No.: 14/697,288

(22) Filed: Apr. 27, 2015

(51) Int. Cl.
G06Q 30/00 (2012.01)
G06Q 30/02 (2012.01)
G06Q 50/00 (2012.01)
G05B 19/418 (2006.01)

(52) U.S. Cl.
CPC ..... G06Q 30/0269 (2013.01); G06Q 30/0277 (2013.01); G06Q 50/01 (2013.01)

(58) Field of Classification Search
CPC . G06Q 30/0269; G06Q 30/0277; G06Q 50/01
See application file for complete search history.

(56) References Cited

U.S. PATENT DOCUMENTS

| 2007/0050253 | A1 | 3/2007 | Biggs et al. | |
|---|---|---|---|---|
| 2007/0276732 | A1* | 11/2007 | Lee | G06Q 30/02 705/14.4 |
| 2008/0097830 | A1* | 4/2008 | Kim | G06Q 30/02 705/14.4 |
| 2010/0023398 | A1* | 1/2010 | Brown | G06Q 30/02 705/14.49 |
| 2010/0114717 | A1* | 5/2010 | Lebeau | G06Q 30/02 705/14.72 |
| 2011/0035263 | A1* | 2/2011 | Ramanathan | G06Q 30/02 705/14.4 |
| 2011/0078023 | A1* | 3/2011 | Aldrey | G06Q 30/02 705/14.55 |
| 2011/0125594 | A1* | 5/2011 | Brown | G06Q 30/02 705/14.73 |

(Continued)

OTHER PUBLICATIONS

"Sharing Enriched Multimedia Experiences across Heterogeneous Network Infrastructures". IEEE. (Year: 2010).*

Primary Examiner — Maria V Vanderhorst
(74) Attorney, Agent, or Firm — Foley & Lardner LLP

(57) ABSTRACT

Systems and methods are provided for dynamically providing and presenting auxiliary content associated with feed items included in a feed. In an embodiment, a client device can include a presentation component configured to render a interface on a display of the device, the user interface comprising a feed with scrollable content items that are continuously updated based on information provided by a server device associated with the feed. The client device can further include an input component configured to facilitate navigation of the feed, and an engagement component configured to identify a content item included in the feed that is associated with a defined level of user engagement based in part on visibility of the content item as presented via the display in response to the navigation of the feed. An auxiliary content item is received and integrated into the interface based on the identification of the content item.

16 Claims, 11 Drawing Sheets

(56) References Cited

U.S. PATENT DOCUMENTS

| | | | |
|---|---|---|---|
| 2011/0231265 A1* | 9/2011 | Brown | G06Q 30/02 |
| | | | 705/14.73 |
| 2011/0258039 A1* | 10/2011 | Patwa | G06Q 30/00 |
| | | | 705/14.45 |
| 2013/0332523 A1 | 12/2013 | Luu | |
| 2014/0172579 A1* | 6/2014 | Peterson | G06Q 30/0269 |
| | | | 705/14.66 |
| 2014/0337868 A1* | 11/2014 | Garza | H04N 21/44218 |
| | | | 725/12 |
| 2015/0012344 A1* | 1/2015 | Guinn | G06Q 30/0209 |
| | | | 705/14.12 |
| 2015/0310484 A1* | 10/2015 | Haile | G06Q 30/0246 |
| | | | 705/14.45 |
| 2015/0373396 A1* | 12/2015 | Makhlouf | H04N 21/222 |
| | | | 725/14 |
| 2016/0012475 A1* | 1/2016 | Liu | G06F 3/013 |
| | | | 705/14.49 |
| 2016/0021213 A1* | 1/2016 | Ruan | G06Q 50/01 |
| | | | 709/204 |
| 2016/0077723 A1* | 3/2016 | Pool | H04L 51/32 |
| | | | 715/738 |
| 2016/0162953 A1* | 6/2016 | Tang | G06Q 30/0269 |
| | | | 705/14.66 |
| 2016/0180392 A1* | 6/2016 | Liu | G06Q 30/0255 |
| | | | 705/14.53 |
| 2016/0219119 A1* | 7/2016 | Yu | H04L 67/22 |
| 2016/0239176 A1* | 8/2016 | Pool | G06F 3/04883 |
| 2016/0247201 A1* | 8/2016 | Pool | G06Q 30/0255 |

* cited by examiner

PROVIDING AN ADVERTISEMENT ASSOCIATED WITH A MEDIA ITEM APPEARING IN A FEED BASED ON USER ENGAGEMENT WITH THE MEDIA ITEM

TECHNICAL FIELD

This application generally relates to systems and methods for providing an advertisement associated with a media item appearing in a feed based on user engagement with the media item.

BACKGROUND

Web based video advertising is one of the fastest-growing and most promising online advertising formats. Video advertisers are increasingly looking for ways to increase capitalization associated with their video advertisements. One mechanism used to accomplish this is through the use of companion advertisements. A companion advertisement is an auxiliary data object related to a core video advertisement that is rendered in association with the core video advertisement. Companion advertisements often embody a display advertisement and include static content (e.g., text, an image, an icon, etc.) configured to remain within the visible display area of the user interface in which a core video advertisement is presented after the core video advertisement is completed or dismissed. Many companion advertisements also include links to additional information associated with the core video advertisement, such as a link to an online store where the user can purchase the product advertised in the core video advertisement.

Companion advertisements drive such a significant amount of additional revenue for video advertisements. Companion advertisements give the user a utility that does not exist with standalone video advertisements. In particular, video advertisements typically cannot be resurfaced after they finish playing or have been dismissed. Because companion advertisements are designed to remain within the visible display area of the user interface after the core video advertisement is finished, companion advertisements provide the user with a sustained advertisement impression and click target.

Currently, companion advertisements are only presented on standalone media content pages that provide the core video advertisement. This model worked well for the web of the last decade where users treated websites as navigation indexes. With this model, users search for content that they want to ingest and then go to its page to consume it. However, today users consume media content in the feed where they discover it. There are various difficulties associated with rending companion advertisements in association with a feed environment. For example, as a user scrolls through a media rich feed, the user may be presented many different video advertisements. Accordingly, mechanisms are needed for determining which companion advertisements to display and when to display them.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
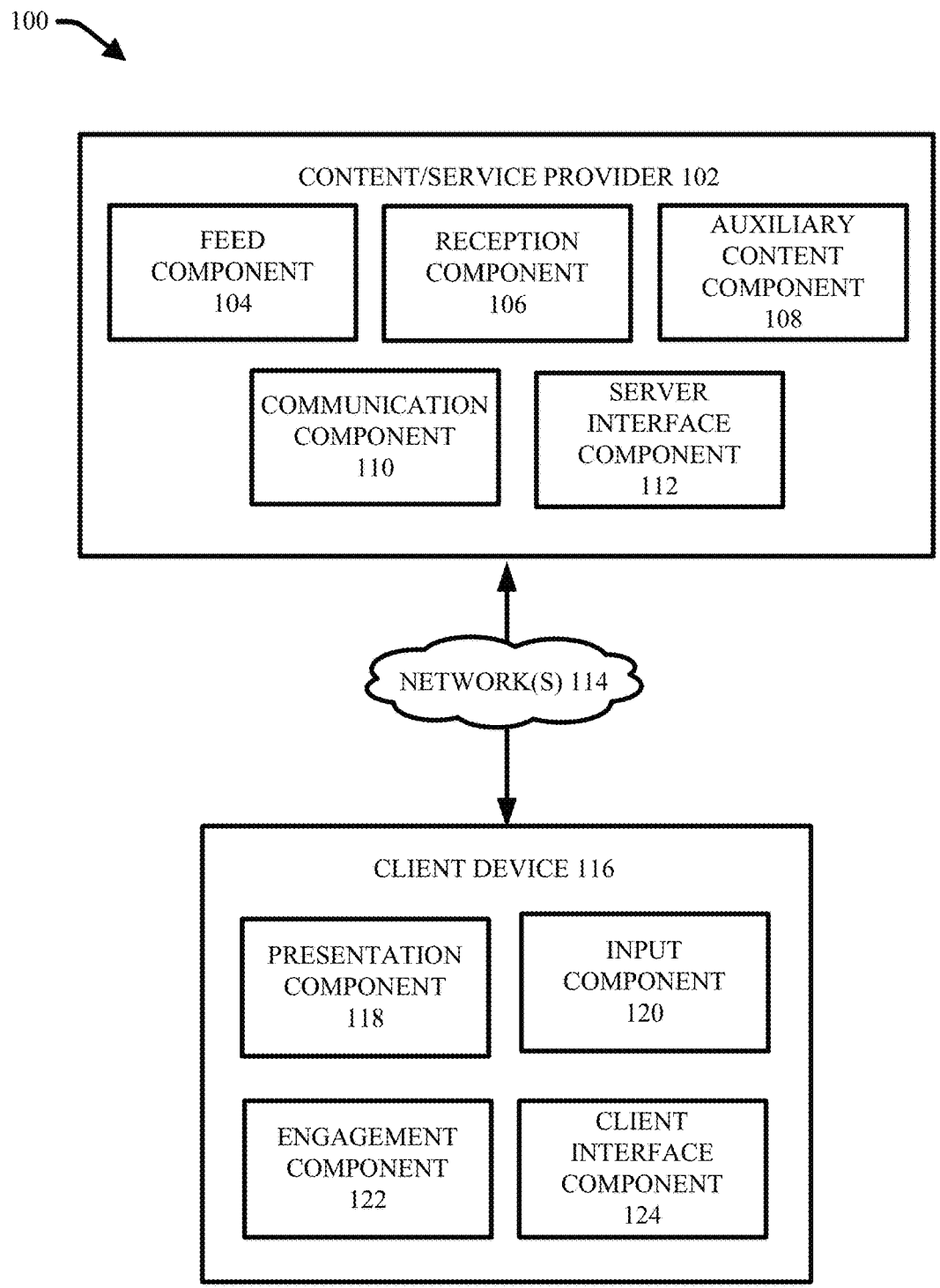
FIG. 1 illustrates an example system for providing auxiliary content associated with a media item appearing in a feed based on user engagement with the media item, in accordance with various aspects and embodiments described herein.

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

By way of introduction, the subject disclosure is related to systems and methods for dynamically selecting, providing and presenting auxiliary content associated with feed items included in a feed based on visibility and/or user engagement with the respective feed items as the user navigates about the feed. The term auxiliary content is used herein to indicate that the auxiliary content is selected based on a predefined relationship with core content of a feed item. In various embodiments, the auxiliary content includes a companion advertisement and the feed item includes a core video advertisement. However, the subject systems and methods can be applied to providing and presenting a variety of different types of auxiliary content items associated with a variety of different feed items.

A feed or newsfeed is an aggregated and regularly or continuously updated list of newly published or updated content at one or more network accessible sources. A feed is presented to users as a dynamic interface component that is accessed via a network platform (e.g., a website or a thin client application) employed by the one or more network accessible sources. Many websites tailor feeds for individual subscribers based on their social affiliations and preferences. For example, social media websites provide individual subscribers with personalized feeds that include feed items or posts with current updates related to other subscribers the individual subscribers are affiliated with (e.g., friends, subscribers, followers, channel hosts, etc.), and/or content the individual subscribers exhibit a preference for.

A feed item refers to a content item included in a feed. Such content items can include text and media (e.g., still images, audio, video, etc.). The types of content items included in a feed can vary depending on the features and functionalities of the feed. For example, a feed for a website that distributes streaming media (e.g., video and audio) may include a list of embedded videos that have been recently uploaded to the website or that have been recently associated with newsworthy developments (e.g., the video was watched, liked, shared, commented on, etc., by a particular user or a number of user). In another example, a feed for a social media website may include comments and content published on the social media website by various subscribers, such as embedded videos that have been shared on the social media website by the various subscribers.

As a user scrolls through a media rich feed that includes content items with video and/or audio components (e.g., an embedded video or audio component), the user is often presented with many different media items. Some of these media items may be configured to automatically begin playing as they become visible on the display as the user scrolls through the feed. Other media items may be configured to begin playing in response to user selection. These media items often include video or audio advertisements. Previously, companion advertisements have not been provided in association with videos and/or audio advertisements included in a feed.

The subject disclosure provides systems and methods for rendering auxiliary content, such as companion advertisements, in association with media items included in a feed based on user interaction with and navigation of the feed. For example, after a user watches a video included in a feed (e.g., at its location within the feed), the user generally continues scrolling through the feed to consume new content, including new media content. Because the user does not need to leave the page including the feed to view and consume the video and the new media content, if a companion advertisement for each media item appearing in the feed is included within the visible screen real estate of the user interface including the feed, the user interface can become cluttered with too many companion advertisements. As a result, a video advertiser will be reluctant to offer a companion advertisement in association with a core video advertisement included in a feed because the impression impact of the companion advertisement may be weakened by a compiled mess of other companion advertisements. In addition, as the user continues to consume new content within the feed, companion advertisements that were integrated into the user interface in association with a previously consumed media item may not be relevant the user. Accordingly, mechanisms are needed for determining which companion advertisements to display and when to display them.

In various embodiments, auxiliary content (e.g., a companion advertisement) for a media item included in a feed (e.g., a video and/or audio advertisement) is dynamically included and/or removed from the user interface based on a variety of factors related to user interaction with the feed and user engagement with the media item. These factors can include but are not limited to, visibility of the media item, duration of time the media item is played, comments associated with the media item, user endorsement of the media item, endorsement of the media item by other users (e.g., friends of the user), type of the media item (e.g., a video advertisement, a skippable in-stream advertisement, a non-skippable in-stream advertisement, etc.), and sharing of the media item. Additional factors that control when and how an auxiliary content item is dynamically included and/or removed from a user interface including a feed can include but are not limited to, type of device at which the feed is displayed, orientation of the device, number and appearance of other auxiliary content items included in the visible area of the user interface, and scrolling speed/rate of the.

For example, as a user scrolls through a feed and an embedded video advertisement becomes visible (e.g., it is included in a portion of the graphical user interface currently presented within the dimensions of the rendering device display area), a companion advertisement for the embedded video can be provided in the visible display area of the user interface including the feed. The companion advertisement can eventually disappear after the user scrolls away from the video advertisement (e.g., while it is playing or after it has completed playing). In another example, a companion advertisement for a core video advertisement included in a feed can be rendered after the core video advertisement has played or has played for a threshold duration. According to this example, with respect to autoplaying video advertisements, the companion advertisement is not presented until the core video advertisement begins autoplaying (e.g., when it becomes visible). In another example, a companion advertisement for a core video advertisement included in a feed can be rendered in response to endorsement of the core video advertisement by the user (e.g., liking, commenting on, sharing, etc.).

The placement and appearance of the auxiliary content in the graphical user interface including the feed can vary. In an aspect, the auxiliary content is included in an area of the interface outside of the feed (e.g., as a sidebar element, as a banner advertisement, etc.). In another aspect, the auxiliary content is included within the feed itself. For example, a companion advertisement can be integrated within the feed as a new feed item. According to this example, the companion advertisement can be located near the feed item for which the companion advertisement is based (e.g., above or below the feed item, adjacent to the feed item, etc.). In another aspect, the auxiliary content can be dynamically included/removed in a section of the user interface that provides a collection of recent or relevant auxiliary content items.

In one or more aspects, a device is disclosed that includes a memory that stores computer executable components and a processor that executes at least the computer executable components stored in the memory. These components include a presentation component configured to render a dynamic graphical user interface on a display of the device. The dynamic graphical user interface includes a feed with scrollable content items that are continuously updated based on information provided by a server device associated with the feed. The components further include an input component configured to facilitate navigation of the feed, and an engagement component configured to identify a content item included in the feed that is associated with a defined level of user engagement based in part on visibility of the content item as presented via the display in response to the navigation of the feed. In various embodiments, in response to identification of the content item, the presentation component is configured to receive an auxiliary content item that is selected based on the content item and the association of the content item with the defined level of user engagement, and to include the auxiliary content item in the dynamic graphical user interface.

In another aspect a server device/system is disclosed that includes a memory that stores computer executable components and a processor that executes at least the computer executable components stored in the memory. These components include a reception component configured to receive information identifying a content item, included in a feed of a dynamic graphical user interface displayed at a client device, in response to a determination that the content item is currently visible at the client device. The feed includes scrollable content items that are dynamically updated. The components further include an auxiliary content component configured to select an auxiliary content item based on the information, and a communication component configured to send the auxiliary content item to the client device for inclusion in the graphical user interface.

Still in yet another aspect, a method is disclosed that includes determining, by a device comprising a processor, that a content item included in a feed of a graphical user interface displayed at the client device is associated with a level of user engagement exceeding a threshold level of user engagement. In response to the determining, the method further includes sending, by the device to a server device, information identifying the content item and indicating that the content item is associated with the level of user engagement exceeding the threshold level of user engagement. The method further includes receiving, by the device from the server device, information identifying an auxiliary content item, and in response to the receiving, generating, by the device, an updated version of the graphical user interface including the auxiliary content item, and displaying, by the device, the updated version of the graphical user interface.

The subject systems and methods do not merely recite the performance of some business practice known from the pre-Internet world along with the requirement to perform it using a computer on the Internet. Instead, the solution is necessarily rooted in computer technology in order to overcome a problem specifically arising in the realm of computer networks. In particular, the subject solution is specifically targeted to the goal of dynamically adapting a graphical user interface employed by an Internet based content/service provider to include relevant companion advertisements based on user interaction/navigation of a feed. These companion advertisements are selectively included and removed from the feed based on visibility and/or user engagement with a core video advertisement included in the feed. Delivery and integration of relevant and appropriate companion advertisements into a user interface including a feed significantly increases core Internet based video advertisement monetization, a goal that is particular to the Internet.

Referring now to the drawings, with reference initially to FIG. 1, presented is a diagram of an example system 100 for dynamically selecting, providing and presenting auxiliary content associated with feed items included in a feed in accordance with aspects and embodiments described herein. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

System 100 includes a content/service provider 102 and a client device 116. In accordance with system 100, content/service provider 102 and client device 116 operate in client/server relationship wherein content/service provider 102 employs one or more server devices to provide content and/or services to client device 116 via a network in response to a request made by the client device 116 for such content and/or services from the content/service provider 102. Generally, content/service provider 102 and client device 116 can include memory that stores computer executable components and a processor that executes the computer executable components stored in the memory, examples of which can be found with reference to FIG. 10. The various components of system 100 can be connected either directly or via one or more networks 114. Such network(s) can include wired and wireless networks, including but not limited to, a cellular network, a wide area network (WAD, e.g., the Internet), a local area network (LAN), or a personal area network (PAN). For example, client device 116 can communicate with content/service provider 102 (and vice versa) using virtually any desired wired or wireless technology, including, for example, cellular, WAN, wireless fidelity (Wi-Fi), Wi-Max, WLAN, and etc. In an aspect, one or more components of system 100 are configured to interact via disparate networks.

In various embodiments, content/service provider 102 is an entity configured to provide various type of content and/or services that are accessed by client devices via a website or thin client application employed by the content/service provider 102. In one or more embodiments, the website and/or thin client application employed by the content/service provider 102 can provide a dynamic graphical user interface via which respective users can interface with the content/service provider. The dynamic graphical user interface can include a feed that is generated by the content/service provider 102. Client device 116 can include a presentation component 118 to facilitate rendering or presentation of the dynamic graphical user interface at a display of the client device 116.

For example, content/service provider 102 can include a social networking system that provides social networking services and associated content via a website or thin client application provided on a user's client device 116. The social networking system can allow users to establish virtual accounts via which they can build social networks and communicate with other users who share similar interests and backgrounds. For example, many computer network based social networking systems allow users to share ideas, pictures, video, posts, activities, events, and other interests with people in their social network. Such social networking systems can also generate and provide personalized feeds to individual users with feed items that serve as an aggregated and continuous stream of information regarding activity at the social networking system. For example, feed items can include information regarding content shared and/or posted by respective users and/or updates associated with content provided by the social networking system.

In another aspect, content/service provider 102 is an online merchant configured to sell goods or services to users via a website or thin client application. In another example, content/service provider 102 can include an information system configured to present pictures, articles, blogs, videos, or other types of content items to client devices (e.g., client device 116) via a network (e.g., network 114). According to this example, the content provided by the website or application can be configured for downloading, streaming or merely viewing at a client device 116 via the network.

In an exemplary embodiment, content/service provider 102 is a steaming media provider configured to provide streamed media to client devices via a network 114. For example, the streaming media provider can have has access to a voluminous quantity (and potentially an inexhaustible number) of shared media (e.g., video and/or audio) files. In some aspects, the streaming media provider can receive media (e.g., user generated content) uploaded thereto by respective users of the streaming media provider and publish the uploaded media to other users. The media provider can further stream these media files to one or more users at their respective client devices (e.g., client device 120) using network accessible platform (e.g., via a website or thin client application). The media can be stored in memory at content/service provider 102 and/or at various other servers or caches employed by the content/service provider 102.

In an aspect, the streaming media provider can facilitate media consumption/interaction at the streaming media provider in a social networking environment. For example, the streaming media provider can include or employ a social networking system via which respective users can establish profiles or accounts with the media provider via which the respective users can connect with other users, communicate with other users and publicize or share information with the other users regarding their media consumption. For example, users can share information regarding videos watched, videos endorsed, channels subscribed to, comments on videos or channels, videos recommended, shared videos, etc. In addition, the streaming media provider can enable users to establish their own channels which serve as avenues via which they share their own media (e.g., media created, collected or otherwise associated with ownership by the user). Other users of the streaming media provider can subscribe to desired channels to receive information regarding the channels, such as new videos added to the channels, recommended videos from the channels, comments provided by other users in association with the channels, etc.

As used herein, the term channel refers to data content available from a common source or data content having a common topic or theme. A channel can be associated with a curator who can perform management actions on the channel. Management actions may include, for example, adding media items to the channel, removing media items from the channel, defining subscription requirements for the channel, defining presentation attributes for channel content, defining access attributes for channel content, etc. The channel content can be digital content uploaded to the internet-based content platform by a channel curator and/or digital content selected by a channel curator from the content available on the Internet-based content platform. A channel curator can be a professional content provider (e.g., a professional content creator, a professional content distributor, a content rental service, a television (TV) service, etc.) or an amateur individual. Channel content can include professional content (e.g., movie clips, TV clips, music videos, educational videos) and/or amateur content (e.g., video blogging, short original videos, etc.). Users, other than the curator of the channel, can subscribe to one or more channels in which they are interested.

The term media content or media item can include but is not limited to streamable media (e.g., video, live video, video advertisements, animations, music, music videos, sound files and etc.) and static media (e.g., pictures, thumbnails). The term media content or media item also includes a collection of media items such as a playlist including several videos or songs, or a channel including several videos or songs associated with a single media creator or curator.

Client device 116 can include any suitable computing device associated with a user and configured to receive content and/or services from content/service provider 102 via a network. For example, a client device 116 can include a desktop computer, a laptop computer, a television, an Internet enabled television, a mobile phone, a smartphone, a tablet personal computer (PC), a personal digital assistant PDA, or a wearable computing device. As used in this disclosure, the terms "content consumer" or "user" refer to a person, entity, system, or combination thereof that employs system 100 (or additional systems described in this disclosure) using a client device 116.

In various embodiments, client device 116 is configured to present a dynamic graphical user interface via a display of the client device 116 using presentation component 118 in association with access of the content/service provider 102 by the client device 116. As used herein, a dynamic graphical user interface is an interface whose elements dynamically change in response to user input, user navigation of the interface, the occurrence of various events or actions, the passage of time, user context, and other conceivable factors.

In an aspect, presentation component 118 can present or render a dynamic graphical user interface of content/service provider in response to opening of a website of the content/service provider 102 or in response to opening of a client application of the content/service provider. The dynamic graphical user interface can include various elements that facilitate interfacing with the content/service provider 102 in order to receive the content and/or services provided by the content/service provider. For example, when content/service provider 102 is a streaming media provider and/or social networking system at which a user of client device 116 has an established account, the dynamic graphical user interface can include elements related to the user's account.

In one or more embodiments, the dynamic graphical user interface includes at least a feed that is regularly or continuously updated with feed items provided by the content/service provider 102. These feed items can vary depending on the particular content and/or services provided by the content/service provider 102, the user activity at the content/service provider 102 and/or the particular user account for which the feed is generated. However, in accordance with aspects and embodiments described herein, the feed is considered a "media rich" feed, wherein media items are regularly included in the feed as feed items. These media items can include embedded videos, embedded audio files, and embedded animations. An embedded media item refers to a representation of the media item at a network location other than its original hosted location. An embedded media item is included within a media player that facilitates playing of the media item at its embedded location (e.g., within the feed). In one or more aspects, the embedded media item is or includes an advertisement. For example, the embedded media item can be a standalone video and/or audio advertisement, an in-stream video and/or audio advertisement (e.g., a pre-roll, mid-roll, or post-roll video advertisement), or a skippable in-stream video and/or audio advertisement.

Figure 2:
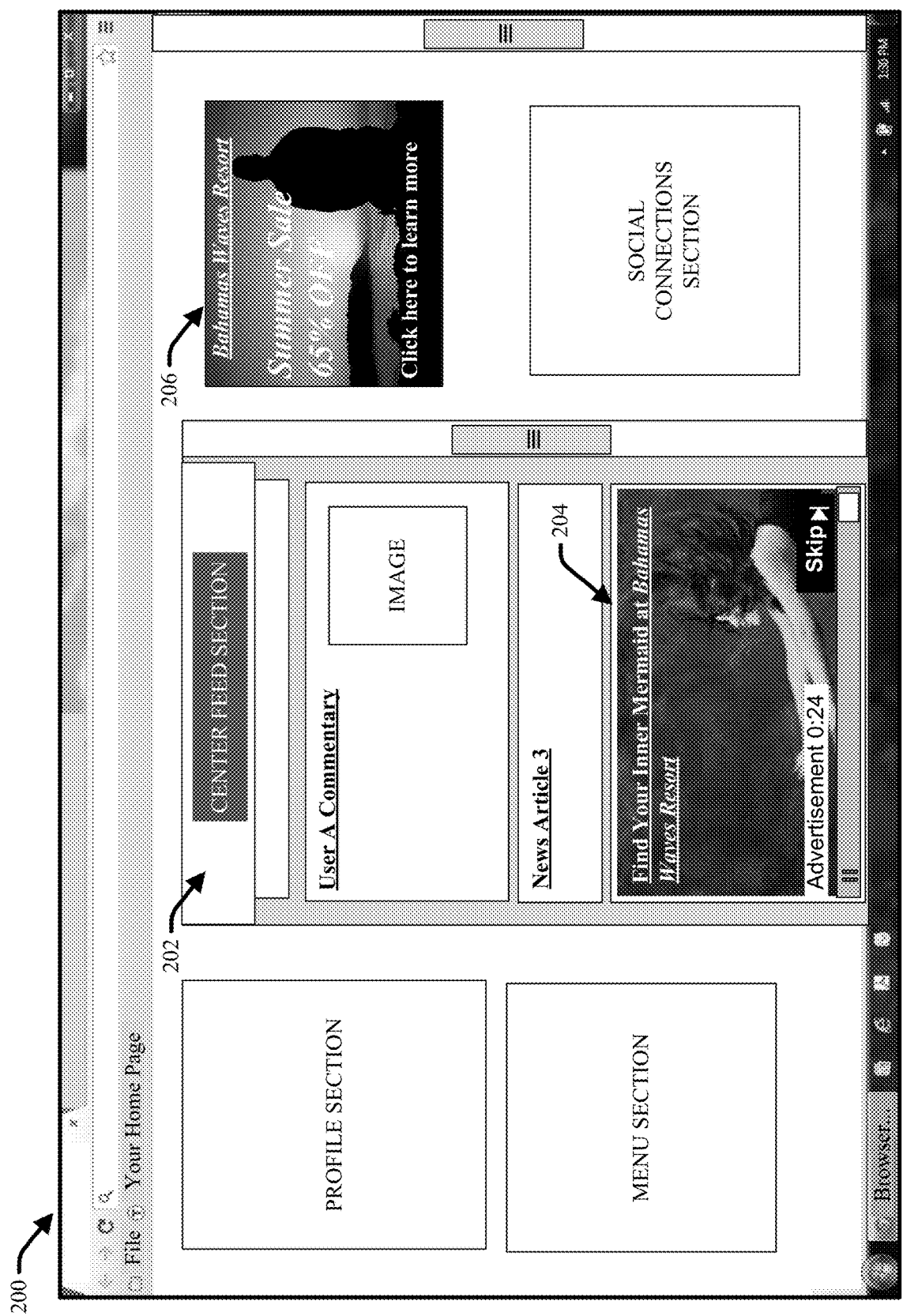
FIG. 2 presents an example user interface displaying a companion advertisement in a feed environment in accordance with various aspects and embodiments described herein.

FIG. 2 presents an example dynamic graphical user interface 200 including a feed with an embedded video as a feed item in accordance with certain embodiments of this disclosure. Interface 200 displays an example view of a user account/profile webpage or application page established by a user in association with usage of a content/service provider, such as content provider 102. For ease of explanation, the account/profile page is for a user named "Erin." The user account/profile webpage can facilitate interaction and usage of the various services and content provided by the content provider. For example, the user account/profile can be established with a streaming media provider that provides streaming media and related services to users. In another example, the user account/profile can be established with a social networking system/service.

In various aspects, the content provider can provide and/or be affiliated with a social networking system/service that allows users of the content provider to establish network identities via their respective user accounts/profiles and employ their network identities to perform various social interactions with other users. For example, the social interactions can include but are not limited to: connecting with other users, communicating with other users, collaborating with one another, establishing social networks and groups, sharing information with one another, sharing media/multimedia with other users (e.g., videos provided by their channel), and receiving updates or notifications regarding activities, actions, preferences, etc., of other users. The social interactions can be associated with usage of the content provider (e.g., chatting about videos provided by the streaming media provider, subscribing to channels provided by users of the streaming media providers, etc.), and/or the social interactions can be associated with usage of another content provider/service.

The dynamic graphical user interface 200 can include various sections, such as a profile section, a menu section, a social connections section, etc. A feed 202 is provided in the center area of the interface. The feed 202 includes various feed elements that are dynamically included in the feed (e.g., by feed component 104). The feed is scrollable such that the Erin can scroll through the feed to bring various feed items into the visible display area of the graphical user interface 200. Of particular relevance to the subject systems and methods is the embedded video 204 included in the feed 202. In an aspect, the embedded video appeared in the visible display area of the interface in response to scrolling down the feed. The embedded video 204 is a skippable video advertisement for Bahamas Waves Resort. In an aspect, the embedded video began playing automatically in response to becoming visible to Erin (e.g., in response to scrolling). In another aspect, the embedded video is an in-stream pre-roll advertisement included with a primary video that began playing in response to selection of a primary video by Erin.

Of additional relevance to the subject systems and methods is the auxiliary content item 206 displayed in the upper right hand corner of the interface 200. The auxiliary content item 206 is a companion advertisement 206 that is related to the video advertisement for Bahamas Waves Resort. As described in greater detail infra, the companion advertisement 206 was dynamically integrated into the dynamic graphical user interface 200 based on at least visibility and/or user engagement with the embedded video 204 advertisement. For example, in one aspect, the companion advertisement was included in the graphical user interface 200 in response to playing of the video advertisement. In various embodiments, after the video advertisement is completed or dismissed (e.g., in response to selection of the skip option), the companion advertisement can be configured to remain within the visible display area of the graphical user interface until the user scrolls away from the embedded video 204 and the embedded video is not longer visible, until the passage of a predetermined amount of time, or until a new auxiliary content item is selected for inclusion of in the graphical user interface 200.

Referring back to FIG. 1, in various embodiments, content/service provider 102 can include feed component 104 to facilitate generation of a feed that is included in a dynamic graphical user interface presented at client device 116 in association with access of the content/service provider 102 by the client device 116. For example, feed component 104 can facilitate generation of feed 202. In an aspect, feed component 104 is configured to determine what feed items to include in a feed, how to include them, and when to include them. For example, when content/service provider 102 is a social networking system, feed component 104 can determine what feed items to include a feed for a particular user that has an account with the social networking system. The feed can include feed items such as embedded videos shared by other users at the social networking system, pictures shared by other users at the social networking system, articles, news worthy events, comments, posts, media advertisement, etc. Feed component 104 can further facilitate generation of the feed at client device 116 by providing information regarding what feed items to include in a feed, when to include them and how to include them, to server interface component 112 and/or client interface component 124.

In one aspect, the dynamic graphical user interface presented at client device 116 via presentation component 118 is a server-side dynamic webpage/application page. A server-side dynamic webpage is a webpage whose construction is controlled by an application server processing server-side scripts. In server-side scripting, parameters determine how the assembly of every new web page proceeds, including the setting up of more client-side processing. According to this aspect, content/service provider 102 can include server interface component 112 to generate scripts that define the elements of each instance of the dynamic graphical user interface. Such scripts can control the look and feel of the dynamic graphical user interface, including what content items are to be included in a feed and how they are to be included (as informed by feed component 104). As the elements of the dynamic graphical user interface change, such as in response to requests/input received from the client 116 and/or information determined by feed component 104, (and more particularly, information determined by auxiliary content component 108, discussed infra), server interface component 112 can generate new scripts that redefine the current elements of the dynamic graphical user interface. Server interface component 112 can further provide the scripts to the client device 116 for interpretation and generation/presentation of the dynamic graphical user interface by presentation component 118.

In another aspect, the dynamic graphical user interface presented at client device 116 via presentation component 118 is a client-side dynamic webpage/application page. A client-side dynamic web page processes the web page using hypertext markup language (HTML) scripting running in the browser as it loads. According to this aspect, client device 116 can include client interface component 124 to use client-side scripting to change the elements/behaviors of the dynamic user interface presented by presentation component 118 in response user input (e.g., mouse, keyboard, touch screen, vocal commands, etc.) and/or at specified timing events. In this case the dynamic behavior occurs within the presentation.

In yet another aspect, the dynamic graphical user interface presented at client device 116 via presentation component 118 is produced as a result of combined server-side and client-side processing. According to this aspect, server interface component 112 is configured to provide the server-side processing and client interface component 124 is configured to provide the client-side processing necessary to generate and present the subject dynamic graphical user interface. The client and server components that collectively build a dynamic web page/application page are called a web application. Web applications manage user interactions, state, security, and performance. For example, Ajax programming uses a combination of both client-side scripting and server-side requests. It is a web application development technique for dynamically interchanging content, and it sends requests to the server for data in order to do so. The server returns the requested data which is then processed by a client side script. This technique can reduce server load time because the client does not request the entire webpage to be regenerated by the server's language parser; only the content that will change is transmitted.

System 100 is particularly configured to facilitate selective inclusion and removal of auxiliary content for a core media item included in a dynamic graphical user interface presented at client device 116, based on user interaction/navigation with a feed included in the dynamic graphical user interface. In particular content/service provider 102 and/or client device 116 can determine or infer whether to include an auxiliary content item for a core media item included in the interface, what auxiliary content item to include, how to integrate the auxiliary content item in the interface, how to format the auxiliary content item, and when to remove the auxiliary content item from the interface. In one or more embodiments, to facilitate these operations of system 100, in addition to feed component 104 and server interface component 112, content service/provider 102 can include further include reception component 106, auxiliary content component 108 and communication component 110. Further, in addition to presentation component 118 and client interface component 124, client device 116 can include input component 122 and engagement component 122.

An auxiliary content item can include any suitable content item that has a predefined relationship with another content item. For example, an auxiliary content item includes a companion advertisement that has been pre-associated with a specific video advertisement. In another aspect, an auxiliary content item can include information identifying a second video (e.g., title, thumbnail image, link, etc.), that is related to a first video. In another aspect, an auxiliary content item can include information identifying a channel (e.g., title, thumbnail image, link, etc.) at which a particular video is included. Information defining associations between content items and their auxiliary content items can be stored in memory accessible to content/service provider 102.

In one or more embodiments, auxiliary content component 108 is configured to determine or infer whether to include an auxiliary content item in a dynamic graphical user interface presented at client device 116 based on visibility and/or user engagement with a core content item included in a feed of the dynamic graphical user interface. In particular, auxiliary content component 108 can receive (e.g., from client device 116) and/or determine information identifying core media items included in a feed at client device 116 that are currently visible and/or associated with a defined level of visibility. Auxiliary content component 108 can also receive (e.g., from client device 116) and/or determine information identifying core media items included in the feed that are currently engaged with and/or associated with a defined level of user engagement.

In an aspect, in response to a determination that a core media item included in the feed is currently associated with a level of visibility and/or a level of engagement above a threshold visibility and/or engagement level, auxiliary content component 108 can determine that an auxiliary content item, related to the core media item, should be included in the dynamic graphical user interface. The auxiliary content component 108 can further select the auxiliary content item and facilitate its inclusion in and removal from the graphical user interface. For example, communication component 110 can send the auxiliary content item to client device 116 for inclusion in the graphical user interface. Presentation component 118 and/or client interface component 124 can then effectuate the integration and rendering of the graphical user interface with the included auxiliary content item.

In some embodiments, information regarding current level of visibility and/or user engagement with core media items included in a feed of a dynamic graphical user interface presented at client device 116 can be provided to content/service provider 102 by client device 116. For example, client device 116 can regularly (e.g., in real-time or substantially real-time) report information to content/service provider 102 identifying currently visible and/or engaged with media items included in the feed. Client device 116 can include engagement component 122 to determine the information and content/service provider 102 can include reception component 106 to receive the information.

In accordance with these embodiments, user engagement component 122 can determine what core media items are currently visible in a feed displayed at client device 116, and a current level of visibility of the media items. In an aspect, user engagement component 122 is configured to determine and report (to content provider 102) when a media item included in the feed becomes visible and/or is associated with a level of visibility exceeding a threshold level of visibility. User engagement component 122 can also be configured to determine and report information indicating when the media item is no longer visible or has a visibility below a threshold visibility level. Currently visible media items reported by user engagement component 122 are considered candidates for which an auxiliary content item could be included in the dynamic graphical user interface. In some aspects, user engagement component 122 can be configured to inform content/service provider 102 that a core media item is visible after it has been visible for a predetermined duration of time (e.g., more than X seconds).

As used herein, the term visibility refers to whether and to what degree a content item included in a graphical user interface displayed at client device 116 can be currently seen by a user of the client device 116. For example, as a user scrolls through a feed included in the user interface, content items included in the feed that are positioned within the visible dimensions of the display screen can change. For instance, when scrolling through a vertical/column feed, feed items will appear at the bottom of the display screen and eventually move upward out of the visible area of the display screen. The visibility of a content item included in a user interface can also vary based on the dimension of a window in which the interface is provided (e.g., including whether the window is minimized), the position of a re-sized window including the interface, the position of the window including the user interface with respect to other windows/tabs open at the client device 116 and/or level of zoom of the interface.

User engagement component 122 can also be configured to determine and send information to content/service provider 102 regarding current user engagement with a visible media item included in the feed. In one aspect, auxiliary content component 108 can further employ this information to determine a level of user engagement with the media item. In another aspect, engagement component 122 can be configured to determine a current level of user engagement with a visible media item based on various signals regarding user engagement with the media item. In response to a determination that the level of user engagement is above a threshold level, the engagement component 122 can send information to content/service provider 102 identifying the media item that is currently visible and that is associated with a level of engagement greater than the threshold level. Reported media items that are currently visible and/or associated with a threshold level of user engagement can be considered candidates for which an auxiliary content item could be included in the dynamic graphical user interface. In some aspects, user engagement component 122 can also be configured to determine and report information indicating when the level of engagement with the media item falls below the threshold level.

User engagement with a media item refers to whether and to what degree a user is considered engaged with the media as included in a graphical user interface presented to the user. Engagement can be measured in various ways depending on the type of content item. In one aspect, with respect to video and/or audio media items included in feeds, engagement can be measured based on whether and for how long a media item is played. For example, as a user scrolls through a feed, the user can select a media item included in the feed for playing or simply pass by the media item without watching it. Naturally, selection indicates the user is interest in the media item while passing by indicates the opposite. Further, after selecting the media item for playing, the user can shortly thereafter (e.g., within a defined time frame, such as 10 seconds), stop the playing of the media item after determining they are not interested in watching the rest, or play the media item to completion or for a significant amount of time (e.g., with respect to a threshold duration or percentage, such as more than 50% of the video). The longer the user a media item plays, the stronger the indication the user is engaged/interested in the media item. In another example, when the core media item included in the feed is a skippable media advertisement, selection of the skipping option can indicate disengagement with the media advertisement.

In yet another example, some media items included in a feed can be configured to automatically begin playing after they become visible in response to user navigation/scrolling of the feed. According to this example, visibility and playing of the media item alone may not be considered a signal of user engagement. For example, if the user stops the auto-playing video shortly after it begins playing, the user may be considered disengaged with the video. In another example, the video may be configured to automatically begin playing yet without sound. In order to play the video with sound, manual user input to activate the sound is required. Accordingly, user activation of the sound can indicate engagement while continued playing of the video without sound can indicate disengagement.

User engagement with a media item included in a feed can also be measured based on whether and how the user provides feedback regarding endorsement of the media item. Endorsement of the media item can include but is not limited to: marking the media item as liked, re-watching the media item or part of the media item, providing a review of the media item, rating the media item, sharing the media item, and commenting on the media item.

In another aspect, user engagement with an item appearing in a feed can be determined based in part on scrolling rate and patterns. For example, if a user quickly scrolls past a media item in the feed, the user can be considered disengaged with the media item. However, if after a media item included in the feed becomes visible and the user's scrolling rate slows or pauses to allow for assumed viewing of the media item, a stronger level of user engagement can be discerned. In another aspect, a user can scroll past a media item included in a feed and shortly thereafter scroll back to bring the media item back to the visible area of the display screen for viewing/playing. Such a scrolling pattern can indicate a strong sense of user engagement/interest with the media item.

Various additional mechanisms for finely tuning a user's level of engagement with a media item included in a feed are within the spirit of the subject disclose. For example, mechanisms related to measuring user biometric signals (e.g., hear rate, blood pressure, etc.), measuring user movement, measuring user emotional reactions (e.g., via facial recognition of smiling, frowning, etc., via biometric measurements, via interpretation of sounds such as laughing, etc.), measuring user gaze, measuring a user's proximity to client device 116, etc. and correlating these measurements to user engagement with a video can be applied to the subject systems and methods to facilitate determining whether and to what degree a user is currently engaged with the video.

In various embodiments, engagement component 122 is configured to monitor a user's interaction/navigation with a feed included in a dynamic graphical user interface presented at client device 116 in real-time or substantially real-time to detect and determine information indicative of current user engagement with a visible media item included in the feed. This information can include data corresponding to one or more of the various measures of user engagement discussed above (e.g., video play duration, video endorsement, user input turning on sound for an auto-playing video, scrolling speed, scrolling behavior, etc.). User engagement component 122 can further report this information to content/service provider 102 and/or determine a current level of user engagement with the media item based on the aggregate information (e.g., by using an algorithm that relates the individual factors associated with user engagement to an output engagement level value). In some aspects, the engagement component 122 can be configured to send information to content/service provider 102 identifying a media item included in a feed (as a candidate for a provision of its associated auxiliary content item) in response to a determination that the current level of user engagement is above a threshold level.

For example, via input component 120, a user of client device 116 can scroll through the feed, select items included in the feed, interact with media items included in the feed, play media items included in the feed, stop playing of media items included in the feed, comment on media items, share media items, like or rate the media item, etc. User engagement component 122 can track/monitor user engagement with a media item based on received user input signals (e.g., received by input component 120) regarding user interaction with a media item included in the feed and/or scrolling of the feed. For example, based on received user input, engagement component 122 can determine whether and when a media item included in the feed is played, the duration of playing, whether the user provided input stopping playing of the media item, whether the user provided input activating sound of an automatically playing media item, whether the user provided input deactivating sound of a playing media item, whether the user provided input indicating a liking of the media item, whether the user provided input, commenting on the media item, whether the user provided input sharing the media item, etc. Engagement component 122 can also determine and analyze scrolling rates and patterns of the feed based on user input. This information can further be employed by engagement component 122 and/or auxiliary content component 108 to determine a current level of user engagement with the media item.

In various additional embodiments, content/service provider 102 can identify a currently active/engaged with media items included in a feed based on a received requests to play the media item. In particular, media items embedded as feed items can be hosted and provided by content/service provider 102. In response to a request to play an embedded media item within the feed, content/service provider 102 can receive the request (e.g., via reception component 106) and stream the embedded video content to the client device to effectuate playing of the embedded video within the media player included in the feed. Content/service provider 102 can receive information with the request to play the embedded media item indicating that the embedded media item is in fact a feed item and the request to play the embedded media item is a request to play the embedded media item in the feed.

After auxiliary content component 108 has received and/or determined information identifying a currently visible and/or engaged with core media item included in a feed, and/or after auxiliary content component 108 has received or determined information regarding a level of visibility and/or a level of user engagement associated with the media item, auxiliary content component 108 is configured to determine whether an auxiliary content item for the media item can and should be included in the dynamic graphical user interface. Auxiliary content component 108 can further select the auxiliary content item for inclusion in the dynamic graphical user interface.

In various embodiments, auxiliary content component 108 can be configured to first determine whether an auxiliary content item, for a core media item included in a feed of a dynamic graphical user interface should be integrated within the graphical user interface based on whether the core media item has or is associated with an auxiliary content item. For example, content/service provider 102 can include or have access to a plurality of auxiliary content items that have been respectively associated with core media items. For instance, content/service provider 102 can include or have access to a plurality of companion advertisements that are respectively associated with core video advertisements. In an aspect, the companion advertisements are respectively provided by the entities that provide the core video advertisements. Not all visible/engaged with core media items may have auxiliary content items pre-associated therewith. Thus in an aspect, even if a core media item is considered currently visible/engaged with, it will not activate integration of an auxiliary content item unless it has been pre-associated with an auxiliary content item. Thus, prior to performing analysis regarding level of visibility/engagement with a core media item and/or whether a core media item can and should activate integration of an auxiliary content item, auxiliary content component 108 can first determine whether the core media item has an auxiliary content item pre-associated therewith.

In one or more embodiments, after it is determined that a core media item included in a feed of a dynamic graphical user interface is associated with an auxiliary content item, auxiliary content component 108 can determine whether the auxiliary content item should be included in the graphical user interface based on one or more of the following factors: whether the core media item is visible, a level of visibility, duration of visibility, whether the core media item is engaged with, a level of the engagement, specific characteristics of the user engagement (e.g., duration played, commenting, liking, scrolling behavior, etc.), whether content/service provider 102 is authorized to effectuate the integration of an auxiliary content item for the core media item, capabilities of the client device 116, and historical information regarding user interaction with and impression of auxiliary content items.

For example, auxiliary content component 108 can be configured to determine that an auxiliary content item, for a core media item included in a feed of graphical user interface, should be integrated within the graphical user interface in response to a determination that the core media item is currently visible or has a level of visibility above a threshold level. In another example, auxiliary content component 108 can be configured to determine that an auxiliary content item, for a core media item included in a feed of graphical user interface, should be integrated within the graphical user interface in response to a determination that the core media item has been visible within the feed for a specified duration (e.g., more than X seconds). This factor can be correlated directly to user scrolling speed/behavior. In another example, auxiliary content component 108 can be configured to determine that an auxiliary content item, for a core media item included in a feed of graphical user interface, should be integrated within the graphical user interface in response to a determination that the core media item is currently active (e.g., being played) or is currently associated with a level of user engagement (based on the various measure of user engagement discussed above) above a threshold level of user engagement.

In another example, auxiliary content component 108 can be configured to determine that an auxiliary content item, for a core media item included in a feed of graphical user interface, should be integrated within the graphical user interface in response to a determination that the core media item was played, was played with sound (e.g., in response to user input requesting the sound), or was played for a specific duration (e.g., more than N seconds) level. In another example, auxiliary content component 108 can be configured to determine that an auxiliary content item, for a core media item included in a feed of graphical user interface, should be integrated within the graphical user interface in response to a determination that the core media item is currently visible and that the user has provided some indication of endorsement of the core media item (e.g., by liking the core media item, commenting on the core media item, sharing the core media item, etc.). In yet another example, auxiliary content component 108 can be configured to determine that an auxiliary content item, for a core media item included in a feed of graphical user interface, should be integrated within the graphical user interface in response to a determination that the core media item is currently visible and a particular scrolling rate (e.g., less than a threshold rate) or behavior (e.g., scrolling back to the core media item) performed by the user.

After auxiliary content component 108 has determined that an auxiliary content item can and should be integrated within the dynamic graphical user interface, communication component 110 can send the auxiliary content item to the client device 116. Upon reception, client device 116 can integrate the auxiliary content item into the dynamic graphical user interface. In an embodiment, communication component 110 can send the auxiliary content item to the client device with instructions (e.g., scripts) determined by server interface component 112 suggesting or controlling where the auxiliary content item is to be included in the dynamic graphical user interface, when it is to be included, and when it is to be removed. In response to reception of the auxiliary content item and associated instructions, client interface component 124 and/or presentation component can effectuate the integration of the auxiliary content item in accordance with the instructions. According to this embodiment, the dynamic functionality and appearance of the graphical user interface can be controlled in full or in part by the content/service provider 102

For example, server interface component 112 can generate interface information defining the elements of the dynamic graphical user interface and the communication component can provide the interface information to the client device 116. In response to reception, the client interface component 124 and/or the presentation component 118 can interpret/process the interface information and generate the dynamic graphical user interface. When an auxiliary content item is to be integrated into the interface, the sever interface component 112 can generate updated interface information that defines an updated version of the graphical user interface including the auxiliary. The communication component can further send the updated interface information to the client device 116 for processing and generation of an updated version of the dynamic graphical user interface including the auxiliary content item.

In another embodiment, communication component 110 can provide the auxiliary content item to the client device 116 with no or partial instructions regarding where to integrate the auxiliary content item, when to integrate it, and when to remove it. According to this embodiment, in response to reception of the auxiliary content item from the content/service provider 102 client interface component 124 and/or presentation component can effectuate the integration of the auxiliary content item in accordance with determinations made by the client interface component 124 and/or partial instructions provided by server interface component 112.

The auxiliary content item can be integrated into an existing dynamic graphical user interface in various manners. In various embodiments, the server interface component 112 and/or the client interface component 124 is configured to integrate the auxiliary content item in an area of the dynamic graphical user interface that is currently visible to the user and configured to remain visible as the user navigates about the interface and the feed. In aspect, the server interface component 112 and/or the client interface component 124 is configured to integrate the auxiliary content item within the dynamic graphical user interface outside of the feed. For example, the auxiliary content item can be integrated into an area of the dynamic graphical user interface referred to as a side bar. In another example, the auxiliary content item can be integrated into an area of the dynamic graphical user interface above the feed, below the feed or on either sides of the feed. In another aspect, the server interface component 112 and/or the client interface component 124 is configured to integrate the auxiliary content item as a floating element or in a pop up window. According to this aspect, the auxiliary content item can be located anywhere within the visible area of the dynamic graphical user interface, floating over or covering/partially covering other elements of the dynamic graphical user interface and configured to remain there until it is dismissed. For example, as shown in FIG. 2, the auxiliary content item 206 is integrated within the graphical user interface 200 as a side bar element.

In some embodiments the server interface component 112 and/or the client interface component 124 is configured to integrate the auxiliary content item into the feed. According to these embodiments, the auxiliary content item can be included in the dynamic graphical user interface as a new feed item.

Figure 3:
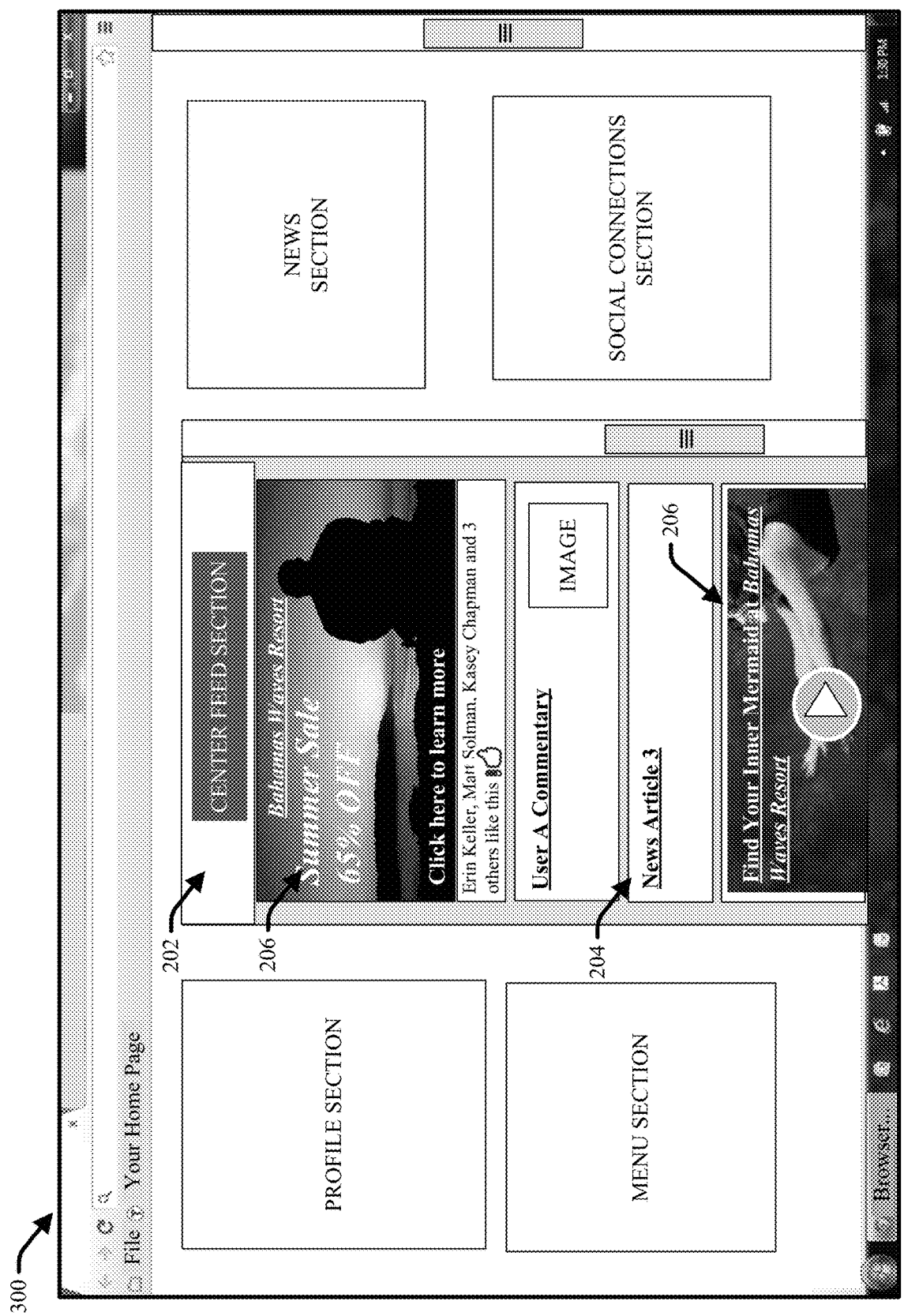
FIG. 3 presents another example user interface displaying a companion advertisement in a feed environment in accordance with various aspects and embodiments described herein.

For example, FIG. 3 presents another example dynamic graphical user interface 300 including a feed with an embedded video as a feed item in accordance with certain embodiments of this disclosure. Interface 300 includes same or similar aspects as interface 200 with a modification to the placement of the auxiliary content item 206. In particular, in interface 300, the auxiliary content item 206 is included in the feed 202 as a new feed item. Repetitive description for like elements employed in respective embodiments is omitted for sake of brevity.

In some aspects, the auxiliary content item can be located in the feed adjacent to the core media item that it is related to. For example, the auxiliary content item can become a new feed item that is placed just below or just above the core media item in the feed.

Figure 4:
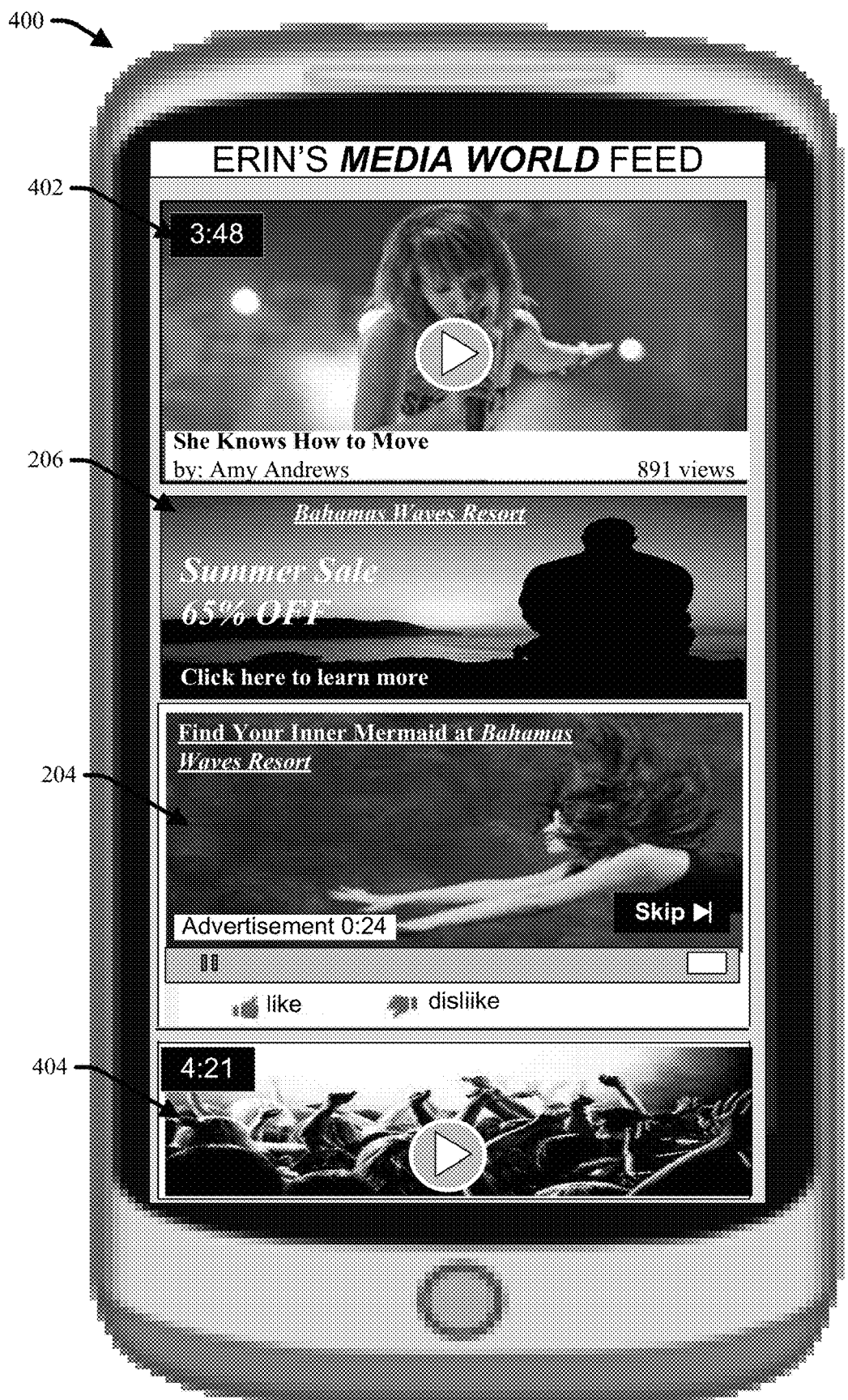
FIG. 4 presents another example user interface displaying a companion advertisement in a feed environment in accordance with various aspects and embodiments described herein.

For example, FIG. 4 presents an example dynamic graphical user interface 400 including a feed with embedded videos in accordance with certain embodiments of this disclosure. In an aspect, interface 400 is the feed presented to user Erin in association with access of her account with a streaming media provider. The feed can be particularly configured to include embedded videos (e.g., embedded video 402, embedded video 206, embedded video 404, and additional embedded videos that are currently not included in the visible area of the display screen). For example, the embedded videos can include embedded videos that other friends of Erin have endorsed, videos that have been recommended to Erin for watching, videos that are related to other videos Erin has watched, etc. Of particular relevance is the inclusion of embedded video 204 and its associated auxiliary content item 206, a companion advertisement for the embedded video advertisement. The auxiliary content item 206 is included in the feed at a position above and adjacent to its core video advertisement. In an aspect, prior to insertion of auxiliary content item 206 into the feed, embedded video 402 was located at the position above and adjacent to embedded video 204, and another feed item (not shown), was located above and adjacent to embedded video 402.

In yet another embodiment, the server interface component 112 and/or the client interface component 124 is configured to included/organize the auxiliary content items into a designated section of the dynamic graphical user interface that serves a collection of recent and/or relevant auxiliary content items. According to this embodiment, each time a new auxiliary content item is selected for inclusion in the graphical user interface (e.g., based on visibility of its core media item in the feed, level of user engagement with the core media item in the feed, etc.), it can be placed in an auxiliary content section of the interface. For example, a dynamic graphical user interface can include a feed with embedded videos, such as interface 400. In an aspect, the feed can be part or a messaging forum in which users select videos for inclusion in the feed and provide comments on the videos. According to this example, an auxiliary content item for an embedded video can include a clip of a portion of the video or an animation from the embedded video, what is commonly referred to as a Vmoji. Each time user interaction with an embedded video in the feed activates (e.g., based on visibility, user engagement, etc.) the integration of its auxiliary content item, its Vmoji, the Vmoji can be collected and included in an auxiliary content section of the user interface for later access and usage by the user.

In some aspects, the auxiliary content items included in the auxiliary content section can be visible in the user interface. In other aspects, in order to access the auxiliary content items, the user can select the auxiliary content section. In various aspects, the number of auxiliary content items in the auxiliary content section can be restricted (e.g., less than N number of auxiliary content items). According to these aspects, the server interface component 112 and/or the client interface component 124 can determine which auxiliary content items to include/remove from the auxiliary content section based on recency of inclusion (e.g., wherein older auxiliary content items are replaced with newer ones) and/or relevance to the user.

Figure 5:
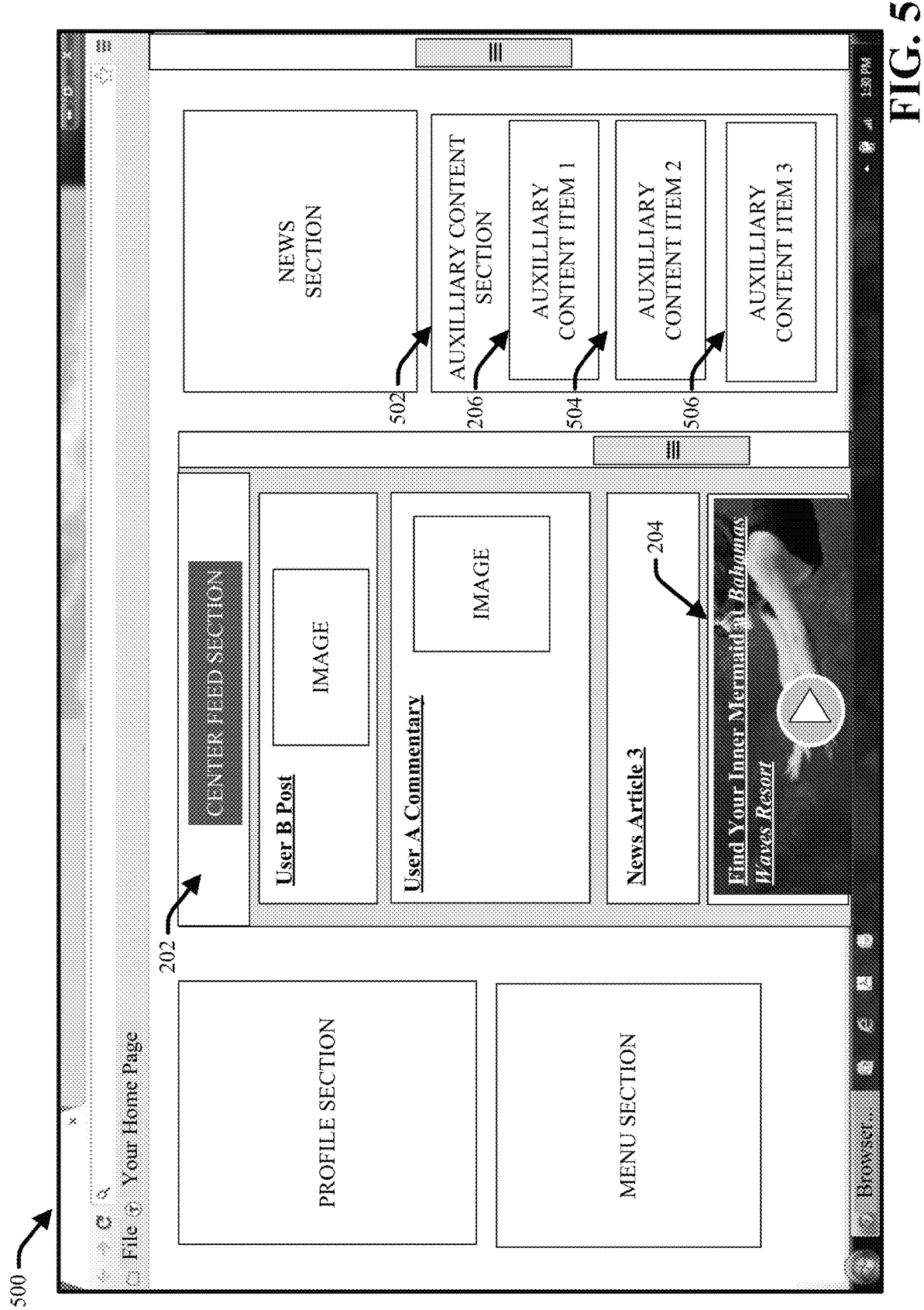
FIG. 5 presents another example user interface displaying a companion advertisement in a feed environment in accordance with various aspects and embodiments described herein.

For example, FIG. 5 presents another example dynamic graphical user interface 500 including a feed with an embedded video as a feed item in accordance with certain embodiments of this disclosure. Interface 500 includes same or similar aspects as interface 200 with a modification to the placement of the auxiliary content item 206. In particular, interface 500 includes an auxiliary content section 502 wherein auxiliary content items are placed. According to this embodiment, auxiliary content item 206 is included in the auxiliary content section 502. The auxiliary content section also includes additional auxiliary content items (e.g., auxiliary content item 504 and auxiliary content item 506). Repetitive description for like elements employed in respective embodiments is omitted for sake of brevity.

In various embodiments the auxiliary content item is intended to be integrated into the dynamic graphical user interface in real-time or substantially real-time in response to reception by client device 116. In an aspect, server interface component 112 and/or client interface component 124 can be configured to cause the auxiliary content item to be integrated within the dynamic graphical user interface while the core media item for which the auxiliary content item is based, is still playing. The end user result would entail playing a core media item within the feed and simultaneously (e.g., shortly after beginning playing), seeing an auxiliary content item dynamically appear in the graphical user interface. In addition, the auxiliary content item can be configured to remain within the dynamic graphical user interface after the core media item finishes playing and/or is dismissed. In other embodiments, server interface component 112 and/or client interface component 124 can be configured to effectuate the integration of an auxiliary content item into the dynamic graphical user interface after the core media item finishes playing or has played for a substantial and predetermined amount of time.

In various embodiments, the location where an auxiliary content item is to be included in the dynamic graphical user interface, when it is to be included, and/or the format for of the auxiliary content item can be determined by the server interface component 112 and/or the client interface component 124 based on various factors. These factors can include but are not limited to, the type and/or characteristics of the auxiliary content item, a predefined requirement for the auxiliary content item, the characteristics (e.g., the elements and arrangement of the elements) of the dynamic graphical user interface, and the features and capabilities of the client device 116.

For example, an auxiliary content item can include text, static images, hyperlinks, an animation, and possibly video. The size, format, and placement of the auxiliary content item can be determined by server interface component 112 and/or client interface component 124 to optimize the total appearance and functionality of the dynamic graphical user interface in view of various component of the auxiliary content item, the arrangement of other graphical elements of the interface (e.g., parallel feeds), the orientation of the interface, and the dimensions of the display screen. In another aspect, some client devices may not be configured to support an aspect of the auxiliary content item. For example, an auxiliary content item having a hyperlink may not be suitable for rendering on an Internet enabled TV because users do not have a way to select the hyperlink. Accordingly, server interface component 112 and/or client interface component 124 can chose to adapt/remove elements of an auxiliary content item (or not display the auxiliary content item), based on compatibility with the client device.

In another example, when the core media item is a video advertisement and the auxiliary content item is a companion advertisement, the advertiser can set requirements for where the companion advertisement should be placed (e.g., in the feed, outside the feed, above the feed, on the side bar, etc.). Accordingly server interface component 112 and/or client interface component 124 can integrate the companion advertisement based on the predefined requirements set by the advertiser regarding placement. In another example, server interface component 112 and/or client interface component 124 can be configured to place auxiliary content items in certain locations based on their type. For example, server interface component 112 and/or client interface component 124 can be configured to place companion advertisements outside the feed, auxiliary content items that are short animations of a core video in a designated section, and auxiliary content items that are video or channels related to a core video, inside the feed as a feed item.

Server interface component 112 and/or client interface component 124 can also be configured to effectuate the removal of auxiliary content items after they have been integrated into the dynamic graphical user interface. In an aspect, server interface component 112 and/or client interface component 124 is configured to remove an auxiliary content item after the core media item for which it was rendered is no longer visible or after passage of a predefined duration of time following completion of the core video. For example, after a core video advertisement in the feed stops playing and a companion advertisement is integrated within the interface, the companion advertisement can be configured to remain within the visible display area of the graphical user until the user scrolls away from the core media item for which the companion advertisement was rendered or until the auxiliary content item has been displayed for a predetermined amount of time. In another example, a companion advertisement integrate within the interface while its core video advertisement is playing can be configured to remain within the visible display area of the graphical user until the user scrolls away from the core video advertisement (while it is playing).

In some aspects, if the core media item was an in-stream video advertisement included in a primary video (e.g., as a pre-roll, mid-roll, or post-roll advertisement), the companion advertisement can be configured to remain within the visible display area of the graphical user until the user scrolls away from the primary video or until the companion advertisement has been displayed for a predetermined amount of time.

In another embodiment, server interface component 112 and/or client interface component 124 can be configured to leave an auxiliary content item displayed in the visible display area of the graphical user interface until it is replaced by a new auxiliary content item. According to this embodiment, server interface component 112 and/or client interface component 124 can configure the graphical user interface such that a fixed number (e.g., one or more) of auxiliary content items are allowed to be displayed at time. As new auxiliary content items are received, they can replace the old. For example, as discussed above, auxiliary content component 108 and communication component 110 can be configured to provide an auxiliary content item in response to a determination that media item included in the feed is visible and/or has been played. According to this example, each time an auto-playing video becomes visible in the feed (in response to scrolling), a new auxiliary content item can be included in the dynamic graphical user interface, wherein each new auxiliary content item can replace a previously presented content item. In another embodiment, when the auxiliary content item is integrated within the dynamic graphical user interface as a feed item, it can be configure to remain (e.g., not be removed) in the feed.

Figure 6:
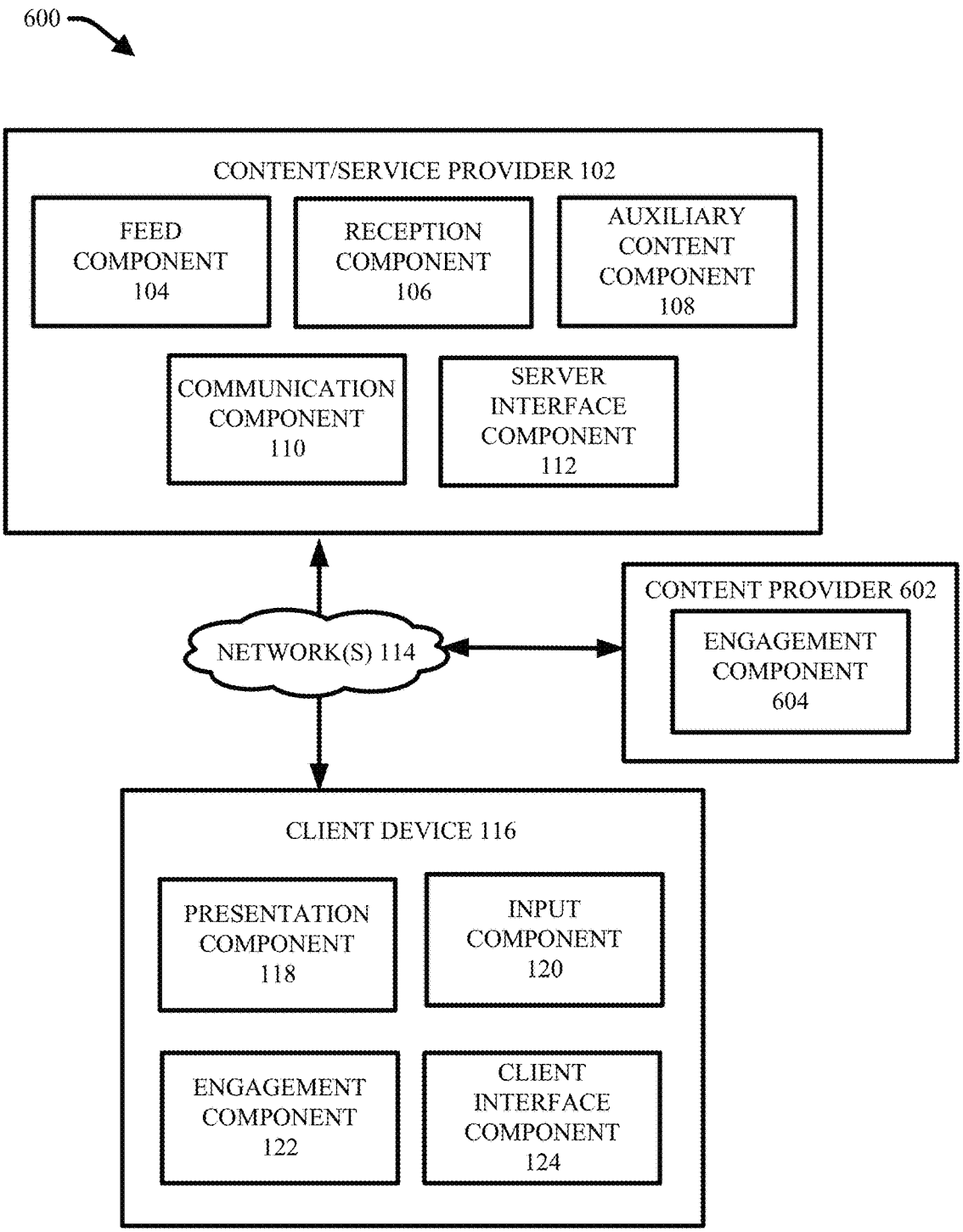
FIG. 6 illustrates another example system for providing auxiliary content associated with a media item appearing in a feed based on user engagement with the media item, in accordance with various aspects and embodiments described herein.

FIG. 6 presents another example system 600 for dynamically selecting, providing and presenting auxiliary content associated with feed items included in a feed in accordance with aspects and embodiments described herein. Repetitive description for like elements employed in respective embodiments is omitted for sake of brevity.

System 600 is similar to system 500 with the addition of another content provider external source 602. System 600 provides an embodiment wherein the dynamic graphical user interface including the feed is provided by content provider 602 and the core media items and their associated auxiliary content items for inclusion in the dynamic graphical user interface are provided by content provider 102. For example, a user of client device 116 can access content provider 602 to receive various content and/or services therefrom. In association with accessing the content provider 602, the client device 116 can render a dynamic graphical user interface that includes a feed with embedded videos.

In one example, content provider 602 can be a social networking system and content provider 102 can be a streaming media system. A user of both content provider 102 and content provider 602 can select a video provided by content provider 102 for sharing as an embedded video at content provider 602. The shared embedded video can appear in another users feed at content provider 602.

In response to an embedded video becoming visible in the feed and/or the various other engagement basis for inclusion of an auxiliary content item, an auxiliary content item for the embedded video can be provided by content to content provider 602 and/or client device 116 for inclusion in the dynamic graphical user interface. In an aspect, the content provider 602 can provide information to content provider 102 identifying the embedded video and indicating that it is visible and/or associated with the requisite amount of user engagement. According to this aspect, content provider 602 can include an engagement component 604 to perform the various features and functionalities as engagement component 122. In other aspects, client device 116 can provide content provider 102 with information regarding a visible and/or engaged with core media item included in the feed. In response to a determination by auxiliary content component 108 that the associated auxiliary content item should be included in the dynamic graphical user interface, communication component 110 can provide the auxiliary content item to content provider 602 and/or client device 116 for integration into the dynamic graphical user interface, in accordance with the various aspects and embodiments described herein.

Figure 7:
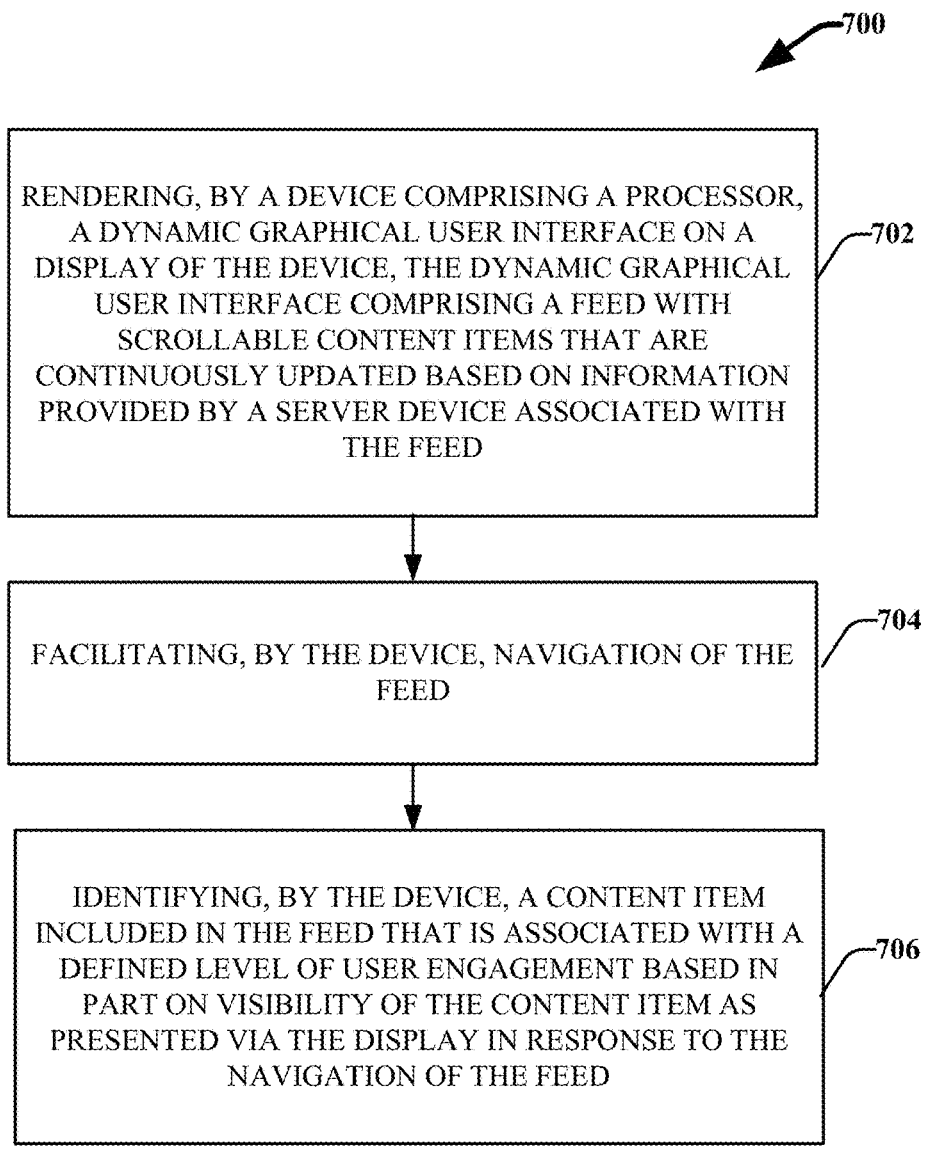
FIG. 7 presents an example method for providing auxiliary content associated with a media item appearing in a feed based on user engagement with the media item, in accordance with various aspects and embodiments described herein.
Figure 8:
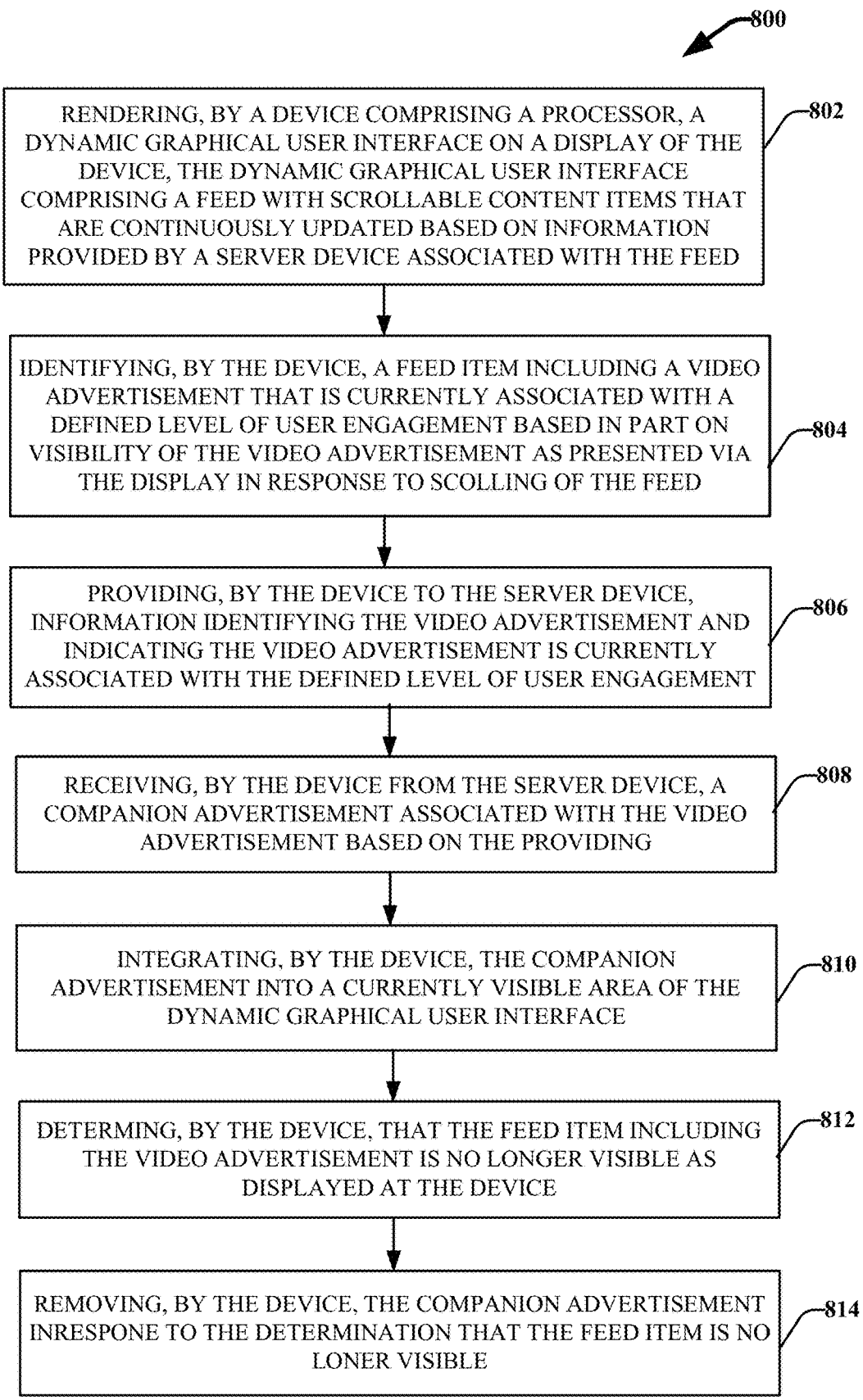
FIG. 8 presents another example method for providing auxiliary content associated with a media item appearing in a feed based on user engagement with the media item, in accordance with various aspects and embodiments described herein.
Figure 9:
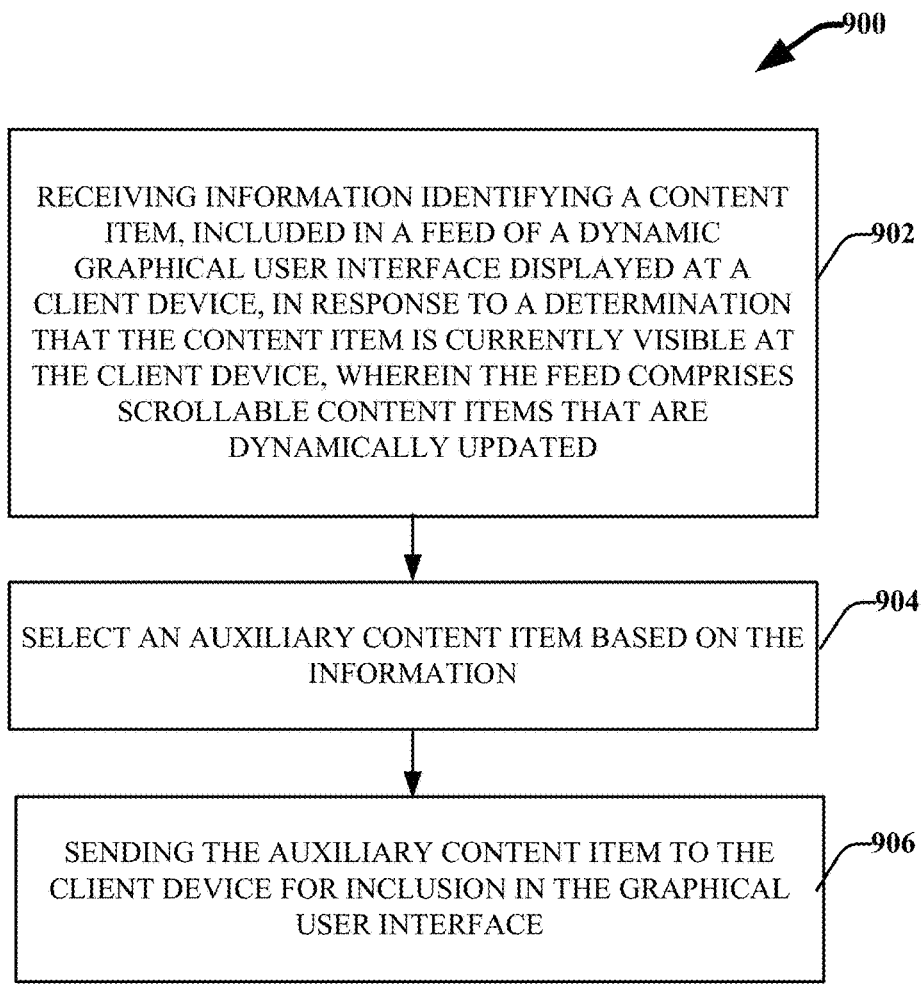
FIG. 9 presents another example method for providing auxiliary content associated with a media item appearing in a feed based on user engagement with the media item, in accordance with various aspects and embodiments described herein.

In view of the example systems and/or devices described herein, example methods that can be implemented in accordance with the disclosed subject matter can be further appreciated with reference to flowcharts in FIGS. 7-9. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 7 illustrates a flow chart of an example method 700 for dynamically selecting, providing and presenting auxiliary content associated with feed items included in a feed in accordance with aspects and embodiments described herein. Method 700 is performed by the client device 116 of system 100 or 600. At 702, the client device renders a dynamic graphical user interface on a display of the device (e.g., via presentation component 118). The dynamic graphical user interface includes a feed with scrollable content items that are continuously updated based on information provided by a server device (e.g., content service/provider 102) associated with the feed. At 704, the client device facilitates navigation and/or interaction with the feed by a user (e.g., via input component 120). For example, the navigation can include scrolling about the feed to view and consume different feed items. At 706, the client device identifies a content item included in the feed that is associated with a defined level of user engagement based in part on visibility of the content item as presented via the display in response to the navigation of the feed (e.g., via engagement component 122). In various aspects, in response to identification of the content item, the presentation component is configured to receive an auxiliary content item that is selected based on the content item and the association of the content item with the defined level of user engagement, and the presentation component is further configured to include the auxiliary content item in the dynamic graphical user interface.

FIG. 8 illustrates a flow chart of another example method 800 for dynamically selecting, providing and presenting auxiliary content associated with feed items included in a feed in accordance with aspects and embodiments described herein. Method 800 is also performed by the client device 116 of system 100 or 600. At 802, a dynamic graphical user interface is rendered by the client device on a display of the device (e.g., via presentation component 118). The dynamic graphical user interface includes a feed with scrollable content items that are continuously updated based on information provided by a server device associated with the feed. At 804, a feed item including a video advertisement that is currently associated with a defined level of user engagement is identify based in part on visibility of the video advertisement as presented via the display in response to scrolling of the feed (e.g., by engagement component 122). At 806, the client device provides the server device with information identifying the video advertisement and indicating that the video advertisement is currently associated with the defined level of user engagement.

At 808, in response to provision of the information to the server device, the client device receives a companion advertisement associated with the video advertisement. At 810, the client device integrates the companion advertisement into a currently visible area of the dynamic graphical user interface (e.g., via presentation component 118 and/or client interface component 124). At 812, the client device determines that feed item including the video advertisement in no longer visible as displayed at the client device (e.g., via engagement component 122). For example, the feed item can be pushed off the visible area of the interface in response to scrolling of the feed by the user. At 814, the client device then removes the companion advertisement from the dynamic graphical user interface in response to the determination that the feed item is no longer visible (e.g., via presentation component 118 and/or client interface component 124).

FIG. 9 illustrates a flow chart of another example method 900 for dynamically selecting, providing and presenting auxiliary content associated with feed items included in a feed in accordance with aspects and embodiments described herein. Method 900 is performed by the content/service provider 102 of systems 100 or 600. At 902, the content/service provider receives (e.g., via reception component 106 information identifying a content item, included in a feed of a dynamic graphical user interface displayed at a client device (e.g., client device 116), in response to a determination that the content item is currently visible at the client device. The feed includes scrollable content items that are dynamically updated (e.g., by feed component 104). At 904, the content/service provider selects an auxiliary content item based on the information (e.g., via auxiliary content component 108). For example, based on a determination that the content item is currently visible in the feed displayed at the client device, the content/service provider can select the auxiliary content item that has been pre-associated with the content item. At 906, the content/service provider then sends the auxiliary content item to the client device for inclusion in the graphical user interface (e.g., via communication component 110).

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 10:
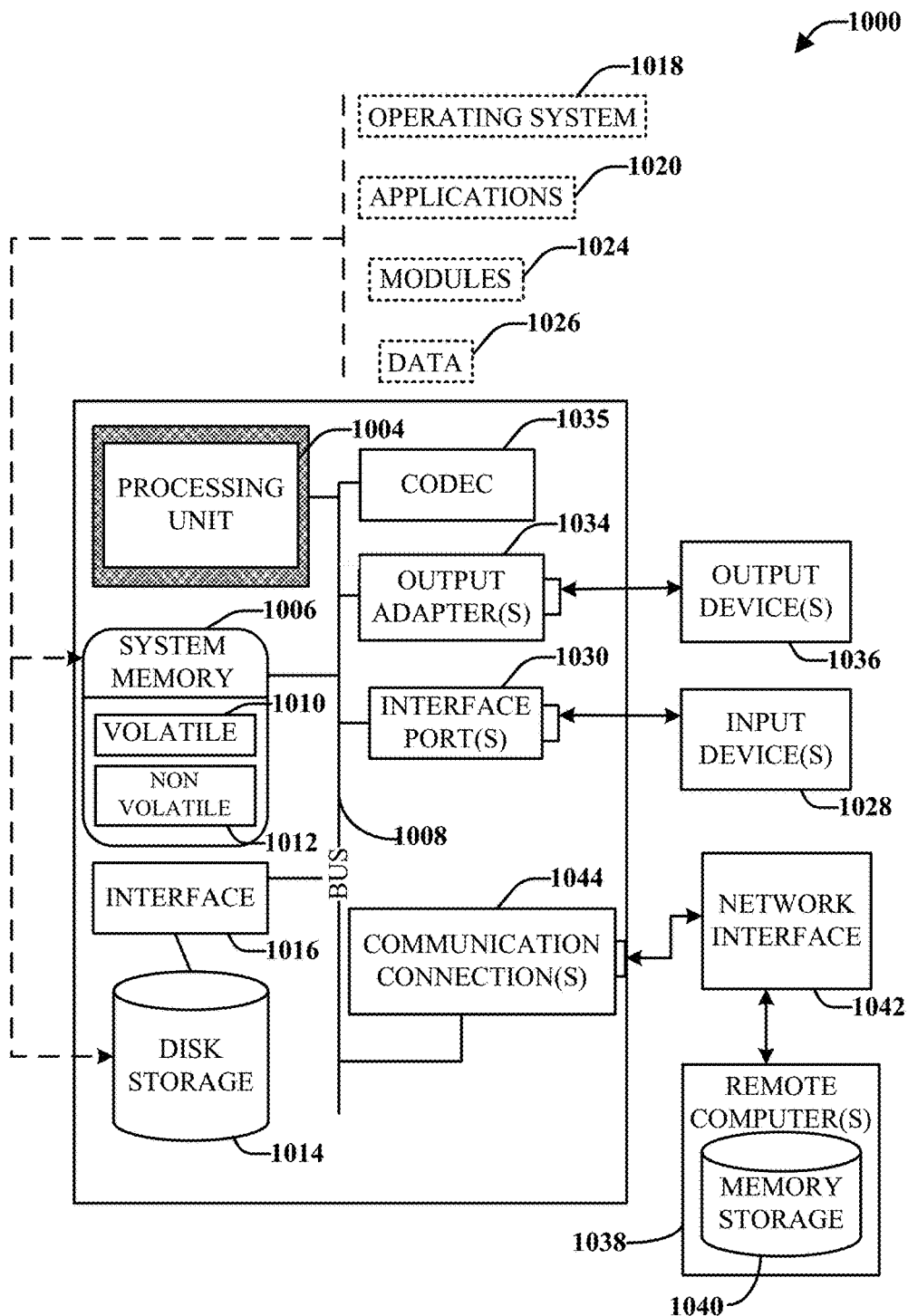
FIG. 10 is a schematic block diagram illustrating a suitable operating environment in accordance with various aspects and embodiments.

With reference to FIG. 10, a suitable environment 1000 for implementing various aspects of the claimed subject matter includes a computer 1002. The computer 1002 includes a processing unit 1004, a system memory 1006, a codec 1005, and a system bus 1008. The system bus 1008 couples system components including, but not limited to, the system memory 1006 to the processing unit 1004. The processing unit 1004 can be any of various available suitable processors. Dual microprocessors and other multiprocessor architectures also can be employed as the processing unit 1004.

The system bus 1008 can be any of several types of suitable bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 10104), and Small Computer Systems Interface (SCSI).

The system memory 1006 includes volatile memory 1010 and non-volatile memory 1012. The basic input/output system (BIOS), containing the basic routines to transfer information between elements within the computer 1002, such as during start-up, is stored in non-volatile memory 1012. In addition, according to present innovations, codec 1005 may include at least one of an encoder or decoder, wherein the at least one of an encoder or decoder may consist of hardware, a combination of hardware and software, or software. Although, codec 1005 is depicted as a separate component, codec 1005 may be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. According to present aspects, the volatile memory may store the write operation retry logic (not shown in FIG. 10) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1002 may also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016.

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s). Thus, for example, a USB port may be used to provide input to computer 1002, and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

Figure 11:
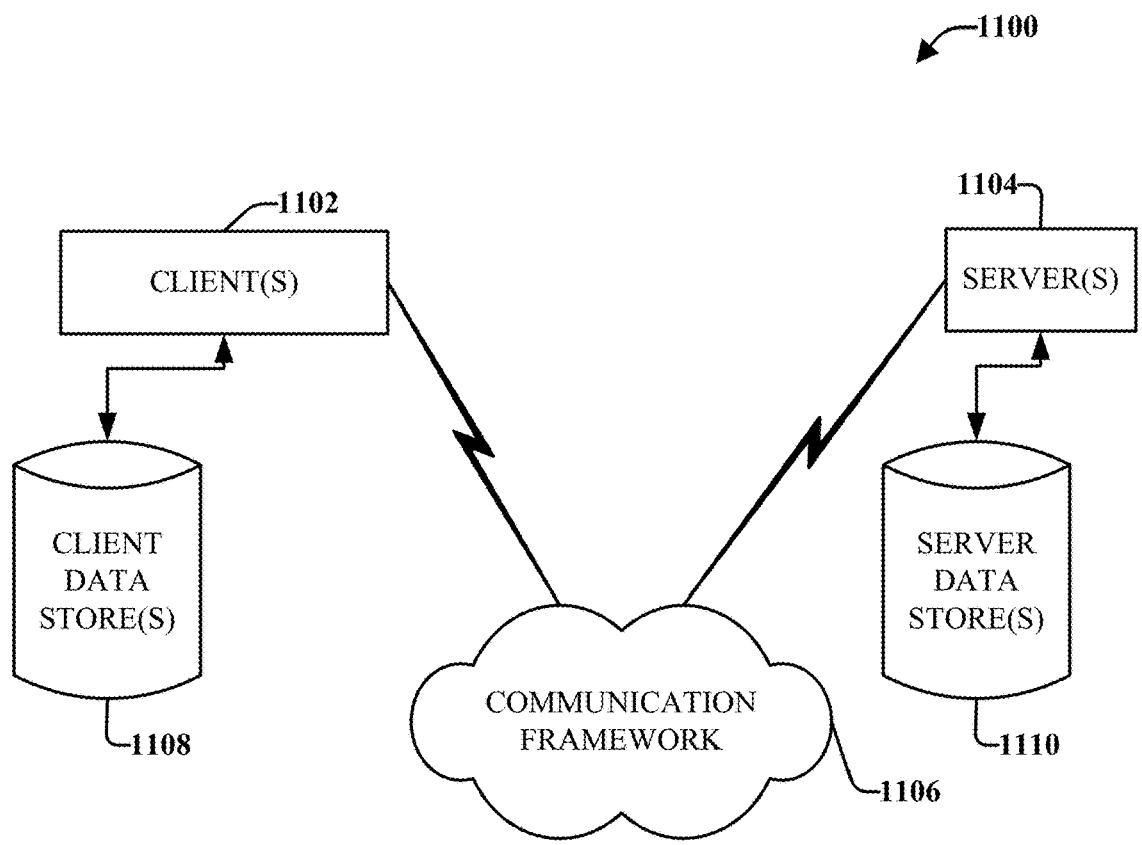
FIG. 11 is a schematic block diagram of a sample-computing environment in accordance with various aspects and embodiments.

Referring now to FIG. 11, there is illustrated a schematic block diagram of a computing environment 1100 in accordance with this disclosure. The system 1100 includes one or more client(s) 1102 (e.g., laptops, smart phones, PDAs, media players, computers, portable electronic devices, tablets, and the like). The client(s) 1102 can be hardware and/or software (e.g., threads, processes, computing devices). The system 1100 also includes one or more server(s) 1104. The server(s) 1104 can also be hardware or hardware in combination with software (e.g., threads, processes, computing devices). The servers 1104 can house threads to perform transformations by employing aspects of this disclosure, for example. One possible communication between a client 1102 and a server 1104 can be in the form of a data packet transmitted between two or more computer processes wherein the data packet may include video data. The data packet can include a metadata, e.g., associated contextual information, for example. The system 1100 includes a communication framework 1106 (e.g., a global communication network such as the Internet, or mobile network(s)) that can be employed to facilitate communications between the client(s) 1102 and the server(s) 1104.

Communications can be facilitated via a wired (including optical fiber) and/or wireless technology. The client(s) 1102 include or are operatively connected to one or more client data store(s) 1108 that can be employed to store information local to the client(s) 1102 (e.g., associated contextual information). Similarly, the server(s) 1104 are operatively include or are operatively connected to one or more server data store(s) 1110 that can be employed to store information local to the servers 1104.

In one embodiment, a client 1102 can transfer an encoded file, in accordance with the disclosed subject matter, to server 1104. Server 1104 can store the file, decode the file, or transmit the file to another client 1102. It is to be appreciated, that a client 1102 can also transfer uncompressed file to a server 1104 and server 1104 can compress the file in accordance with the disclosed subject matter. Likewise, server 1104 can encode video information and transmit the information via communication framework 1106 to one or more clients 1102.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from a computer-readable device or storage media.

What is claimed is:

1. A method comprising:
   determining, by a client device comprising a processor, that a content item included in a dynamic feed of a graphical user interface displayed at the client device is associated with a level of user engagement exceeding a threshold level of user engagement;
   in response to determining that the level of user engagement exceeds the threshold level of user engagement, sending, by the client device to a server device, information identifying the content item and indicating that the content item is associated with the level of user engagement exceeding the threshold level of user engagement;
   receiving, by the client device from the server device, information identifying an auxiliary content item, wherein the auxiliary content item is dynamically selected as a companion item for the content item;
   in response to receiving the information identifying the auxiliary content item, generating, by the client device, an updated version of the graphical user interface including the auxiliary content item at a first position adjacent to the dynamic feed;
   displaying, by the client device, the updated version of the graphical user interface; and
   responsive to detecting a scrolling interaction with the dynamic feed, moving, by the client device, the auxiliary content item from the first position adjacent to the dynamic feed to a second position within the dynamic feed.

2. The method of claim 1, further comprising:
   determining, by the device, that the level of user engagement associated with the content item included in the feed of the graphical user interface displayed at the client device has decreased below the threshold level of user engagement; and
   in response to the determining that the level of user engagement has decreased, removing the auxiliary content item from the updated version of the graphical user interface.

3. The method of claim 1, wherein the determining comprises determining the level of user engagement based on visibility of the content item at the client device.

4. The method of claim 1, wherein the determining comprises determining the level of user engagement based on at least one of: duration of time the content item is visible, duration of time the content item is played, sharing of the content item, and comments received for the content item.

5. The method of claim 1, wherein the content item includes a video advertisement and the auxiliary content item includes a companion advertisement related to the video advertisement, the companion advertisement including a link to additional information associated with the video advertisement.

6. The method of claim 1, further comprising:
   determining, by the client device, a type of the auxiliary content item identifying a type of association between the auxiliary content item and the content item;
   wherein generating the updated version of the graphical user interface comprises placing, by the client device, the auxiliary content item at the first position adjacent to the dynamic feed responsive to determining that the auxiliary content item is of a first type.

7. A client device, comprising: a memory; and
   a hardware processor that, when executing computer-executable instructions stored in the memory, is configured to:
   determine that a content item included in a dynamic feed of a graphical user interface displayed at the client device is associated with a level of user engagement exceeding a threshold level of user engagement;
   in response to determining that the level of user engagement exceeds the threshold level of user engagement, send, to a server device, information identifying the content item and indicating that the content item is associated with the level of user engagement exceeding the threshold level of user engagement;
   receive, from the server device, information identifying an auxiliary content item, wherein the auxiliary content item is dynamically selected as a companion item for the content item;
   in response to receiving the information identifying the auxiliary content item, generate an updated version of the graphical user interface including the auxiliary content item at a first position adjacent to the dynamic feed;
   display the updated version of the graphical user interface; and
   responsive to detecting a scrolling interaction with the dynamic feed, move the auxiliary content item from the first position adjacent to the dynamic feed to a second position within the dynamic feed.

8. The client device of claim 7, wherein the hardware processor is further configured to:
   determine that the level of user engagement associated with the content item included in the feed of the graphical user interface displayed at the client device has decreased below the threshold level of user engagement; and
   in response to the determining that the level of user engagement has decreased, remove the auxiliary content item from the updated version of the graphical user interface.

9. The client device of claim 7, wherein the determining comprises determining the level of user engagement based on visibility of the content item at the client device.

10. The client device of claim 7, wherein the determining comprises determining the level of user engagement based on at least one of: duration of time the content item is visible, duration of time the content item is played, sharing of the content item, and comments received for the content item.

11. The client device of claim 7, wherein the content item includes a video advertisement and the auxiliary content item includes a companion advertisement related to the video advertisement, the companion advertisement including a link to additional information associated with the video advertisement.

12. A non-transitory computer-readable medium containing computer executable instructions that, when executed by a processor of a client device, cause the processor to perform a method, the method comprising:

determining that a content item included in a dynamic feed of a graphical user interface displayed at the client device is associated with a level of user engagement exceeding a threshold level of user engagement;

in response to determining that the level of user engagement exceeds the threshold level of user engagement, sending, to a server device, information identifying the content item and indicating that the content item is associated with the level of user engagement exceeding the threshold level of user engagement;

receiving, from the server device, information identifying an auxiliary content item, wherein the auxiliary content item is dynamically selected as a companion item for the content item;

in response to receiving the information identifying the auxiliary content item, generating an updated version of the graphical user interface including the auxiliary content item at a first position adjacent to the dynamic feed; and responsive to detecting a scrolling interaction with the dynamic feed, moving, by the client device, the auxiliary content item from the first position adjacent to the dynamic feed to a second position within the dynamic feed.

13. The non-transitory computer-readable medium of claim 12, wherein the method further comprises:

determining that the level of user engagement associated with the content item included in the feed of the graphical user interface displayed at the client device has decreased below the threshold level of user engagement; and in response to the determining that the level of user engagement has decreased, removing the auxiliary content item from the updated version of the graphical user interface.

14. The non-transitory computer-readable medium of claim 12, wherein the determining comprises determining the level of user engagement based on visibility of the content item at the client device.

15. The non-transitory computer-readable medium of claim 12, wherein the determining comprises determining the level of user engagement based on at least one of: duration of time the content item is visible, duration of time the content item is played, sharing of the content item, and comments received for the content item.

16. The non-transitory computer-readable medium of claim 12, wherein the content item includes a video advertisement and the auxiliary content item includes a companion advertisement related to the video advertisement, the companion advertisement including a link to additional information associated with the video advertisement.

\* \* \* \* \*